United States Patent
Valles

(10) Patent No.: US 7,302,383 B2
(45) Date of Patent: Nov. 27, 2007

(54) APPARATUS AND METHODS FOR DEVELOPING CONVERSATIONAL APPLICATIONS

(76) Inventor: Luis Calixto Valles, 4202 E. Muirwood Dr., Phoenix, AZ (US) 85048

( * ) Notice: Subject to any disclaimer, the term of this patent is extended or adjusted under 35 U.S.C. 154(b) by 813 days.

(21) Appl. No.: 10/636,991

(22) Filed: Aug. 8, 2003

(65) Prior Publication Data

US 2004/0083092 A1 Apr. 29, 2004

Related U.S. Application Data

(60) Provisional application No. 60/410,064, filed on Sep. 12, 2002.

(51) Int. Cl.
*G06F 17/27* (2006.01)
*G10L 15/00* (2006.01)

(52) U.S. Cl. ........................... 704/9; 704/231

(58) Field of Classification Search ............ 704/9
See application file for complete search history.

(56) References Cited

U.S. PATENT DOCUMENTS

| 6,615,172 | B1 * | 9/2003 | Bennett et al. ............ 704/257 |
| 6,904,428 | B2 * | 6/2005 | Frieder et al. ............ 707/3 |
| 2001/0011217 | A1 * | 8/2001 | Ammicht et al. ......... 704/231 |
| 2002/0165862 | A1 * | 11/2002 | Richards et al. .......... 707/9 |
| 2003/0125955 | A1 * | 7/2003 | Arnold et al. ............. 704/270.1 |

* cited by examiner

*Primary Examiner*—David Hudspeth
*Assistant Examiner*—Samuel G Neway

(57) ABSTRACT

Apparatus includes subsystems for handling different communication acts and a programming interface for configuring the apparatus into a variety of conversational systems, allowing users to communicate interactively in natural language without restrictions whatsoever, either by speech or keyboard, while at the same time the apparatus is capable to interact with external applications.

14 Claims, 23 Drawing Sheets

```
$FirstRule = $Subject;
$Subject = (OBJECT) $NounCategory3 $PrepCategory2 | $NounCategory3 $PrepCategory2 | $NounCategory3;                              ⎫
$SubjectNoun = (OBJECT) $NounCategory3 $PrepCategory2 $PrepCategory2 |                                                            ⎬ 505
                 $NounCategory3;                                                                                                   ⎭

$NounCategory3 = $PersonalPronoun |
                 $ArticleCategory0 $NounCategory2 |
                 $PossesiveCategory0 $NounCategory2 |
                 $NounCategory2;

$NounCategory2 = $AdjectiveCategory2 $NounCategory1 | $NounCategory1;                  ⎫
$NounCategory1 = (VALUE) $NounCategory0 $NounCategory0 |$NounCategory0;                 ⎬ 503
$NounCategory0 = NOUN;                                                                  ⎭

$PersonalPronoun = (VALUE) PERSONALPRONOUN;
//
// Prepositional Categoryegories (including prepositional phrase)
//
$PrepCategory2 = (PLACE_TIME) $PrepCategory1 $NounCategory3 $PrepCategory0 |
                 $PrepCategory1 $NounCategory3;
$PrepCategory1 = $PrepCategory0 | $PrepCategory0 $PrepCategory0;                       ⎫ 500
$PrepCategory0 = PREP;                                                                  ⎭

//-----------------------------------
// Adjective Categoryegories
//-----------------------------------
$AdjectiveCategory2 = (PROPERTY) $Cardinal_Number | $AdjectiveCategory1;                                                ⎫
$AdjectiveCategory1 = $AdjectiveCategory0 $Cardinal_Number |                                                             ⎬ 502
                      $AdjectiveCategory0 $AdjectiveCategory1 |                                                          ⎪
                      $AdjectiveCategory0;                                                                                ⎭
$AdjectiveCategory0 = ADJ;      ⎫ 504
$ArticleCategory0 = a | the;    ⎭ 501

// TERMINAL SYMBOLS:

NOUN = looks nouns up in the dictionary
PERSONALPRONOUN = looks personal pronouns up in the dictionary
PREP = looks prepositions up in the dictionary
AJD = looks adjectives up in the dictionary
```

Figure 5

The boy at the park

The boy with a ball at the park

The boy with a ball at the park on Sunday

- The tall boy with a round ball at the park on Sunday

- The tall boy with a twenty round balls

Figure 6

```
$FirstRule = $Transfer_Request;800
$Transfer_Request = (REQUEST transfer. $Transfer_Cmd | $Path | $Amount;
801 $Transfer_Cmd  (ACTION) $TransferVerb $Amount $Path |
              $TransferVerb $Amount |
              $TransferVerb $Path |
              $TransferVerb $NounCat3 $Path |
              $TransferVerb $NounCat3 |
              $MakeATransfer;

$Path = $FromTo | $ToFrom | $Origin | $Destination;
$FromTo = $Origin $Destination;
$ToFrom = $Destination $Origin;
$Origin = (ORIGIN) $PrepFrom $AccountPhrase | $AccountPhrase;
$Destination = (DESTINATION) $PrepDest $AccountPhrase;
$PrepDest = $PrepTo | $PrepInto;

$PrepFrom = from;
802  $PrepTo = to;
     $PrepInto = into;

$AccountPhrase = $ArticleCat0 $Account | $PossesiveCat0 $Account | $Account;
$Account = (VALUE) $TypeAccount $AccountWord | $TypeAccount;

$TypeAccount = ?;
$AccountWord = account;

$Amount = $Money $Currency | $Money;
$Money = (AMOUNT) $Number_Amount | $NumericValue;
$Currency = (CURRENCY) $Dollar;
$Dollar = dollars;
$Conjunction = $AndConjuct | $WrongConjuct;
803 $AndConjuct = and;
$WrongConjuct = an;
$TransferVerb = $Transfer | $Move;
$Transfer = transfer;
$Move = move;
$MakeATransfer = $Make $TransferNP;
$Make = make;
$TransferNP = $ArticleCat0 $Transfer;

$NumericValue = (VALUE) $Numeric;

$Numeric = NUMERIC;
$ArticleCat0 = ART;
$PossesiveCat0 = POSSES;
$NumberCat0 = NUMBER;
$Number_Amount = (VALUE) $Cardinal_Number;
$Cardinal_Number = NUMBER;

ART = Lookup in the dictionary of articles;
NUMBER = Lookup in the dictionary of numbers;
ADJ = Lookup in the dictionary of adjectives;
POSSES = Lookup in the dictionary of possessives;
NUMERIC = Lookup in the dictionary of numeric values;
```

Figure 8A

```
$FirstRule = $Find_Check_Cleared;

$Find_Check_Cleared =(REQUEST checks_cleared) $Want_To_Know $What_Check;

$Want_To_Know = $I_Want_To_Know_If;

$I_Want_To_Know_If = "i want to know if";

$What_Check = $Vague_Check $Cleared_Verb |
              $Check $Cleared_Verb;

$Vague_Check = $Article $CheckWord;

$Check = (CHECK) $CheckWord $CheckNumeric;

$Article = a;

$CheckWord = check;

$Cleared_Verb = cleared;

$CheckNumber = $Number_Amount | $NumericValue;
```

Figure 8B

```
<EXACT_REQUESTS>
<REQUEST name="transfer" type="ACTION">
    <STATE type="AMOUNT">
        <PROMPT>how much would you like to transfer?</PROMPT>
    </STATE>
    <STATE type="ORIGIN">
        <PROMPT>from which type of account would you like to transfer? </PROMPT>
    </STATE>
    <STATE type="DESTINATION">
        <PROMPT>to what type of account would you like to transfer?</PROMPT>
    </STATE>
    <CLASS name="com.demos.BankDemo">
        <METHOD name="updateBalances">
            <PARAM>AMOUNT</PARAM>
            <PARAM>ORIGIN</PARAM>
            <PARAM>DESTINATION</PARAM>
        </METHOD>
    </OBJECT>
</REQUEST>
<REQUEST name="checks_cleared" type="query">
    <STATE type="CHECKNUMBER">
        <PROMPT>What check number? </PROMPT>
    </STATE>
    <CLASS name="com.demos.BankDemo">
        <METHOD name="getCheck">
            <PARAM>CHECKNUMBER</PARAM>
            <RESULT>DATE</RESULT>
            <RESULT>CHECKAMOUNT</RESULT>
        </METHOD>
    </OBJECT>
</REQUEST>
</EXACT_REQUESTS>
```

Figure 9

Transfer $1000 from my savings account to my checking account

[ACTION transfer ( [AMOUNT [ VALUE $1000 ] ]

[ ORIGIN from [VALUE savings account ] ]

[ DESTINATION to [VALUE checking account ] ] ) ]

```
<EXACT_REQUESTS>                                                              1300
<REQUEST name="reserve" type="action">                                        1301
    <STATE type="CITY">
        <PROMPT>To what city would you like to travel?</PROMPT>               1302
    </STATE>
    <STATE type="DATE">
        <PROMPT> What date will you be checking in? </PROMPT>                 1303
    </STATE>
    <STATE type="LOCATION">
        <DEPENDENCY name="CITY" />                                            1304
        <PROMPT>What area of town would you like to stay?</PROMPT>            1305
    </STATE>
    <STATE type="HOTEL">                                                      1306
        <DEPENDENCY name="LOCATION" />                                        1307
        <OBJECTname="com.demos.HotelReservation">
            <METHOD name="chooseHotel">                                       1308
                <PARAM>LOCATION</PARAM>
                <PARAM>CITY</PARAM>
                <RESULT>HOTEL_LIST</RESULT>
            </METHOD>                                                         1309
        </OBJECT>
        <PROMPT>Which of the following hotels would you like?</PROMPT>
    </STATE>
    <OBJECT name=" com.demos.HotelReservation">
        <METHOD name="reserveHotel">
            <PARAM>LOCATION</PARAM>
            <PARAM>CITY</PARAM>
            <PARAM>DATE</PARAM>
            <PARAM>HOTEL</PARAM>
        </METHOD>
    </OBJECT>
</REQUEST>
</EXACT_REQUESTS >
```

Figure 13

```
11<?xml version="1.0" encoding="UTF-8"?>
<!DOCTYPE REQUEST SYSTEM "file:///gyrus/data/gyrusanswer.dtd">

<GYRUS>
     <OBJECT name="com.demos.BankAnswers">                        1400
          <METHOD name="queryDatabase">
               <PARAM>ACCOUNT</PARAM>                             1401
          </METHOD>
          <METHOD name="getSavingBalance">        1402
               <RESULT>SAVEBALANCE</RESULT>
          </METHOD>
          <METHOD name="getLastDepositToCheckDate">               1403
               <RESULT>LASTDEPOSITCHECKDATE</RESULT>
          </METHOD>
          <METHOD name="getLastDepositToCheck">
               <RESULT>LASTDEPOSITCHECK</RESULT>
          </METHOD>
          <METHOD name="getLastDepositToSaveDate">       1404
               <RESULT>LASTDEPOSITCHECKDATE</RESULT>
          </METHOD>
          <METHOD name="getLastDepositToSaving">
               <RESULT>LASTDEPOSITSAVE</RESULT>         1405
          </METHOD>
          <METHOD name="getLastTransactionAMT">
               <RESULT>LASTTRANSACTIONAMT</RESULT>        1406
          </METHOD>
          <METHOD name="get1stTransactionAMT">
               <RESULT>TRANSACTION1AMT</RESULT>
          </METHOD>                                              1407
          <METHOD name="get2stTransactionaAMT">
               <RESULT>TRANSACTION2AMT</RESULT>
          </METHOD>                                   1408
          <METHOD name="getLastTransactionDate">
               <RESULT>LASTTRANSACTIONDATE</RESULT>
          </METHOD>                                    140
          <METHOD name="get1stTransactionDate">         9
               <RESULT>TRANSACTION1DATE</RESULT>
          </METHOD>
          <METHOD name="get2stTransactionaDate">          1410
               <RESULT>TRANSACTION2DATE</RESULT>
          </METHOD>
         <METHOD name="getLastTransactionType">
               <RESULT>LASTTRANSACTIONTYPE</RESULT>
          </METHOD>
          <METHOD name="get1stTransactionType">
               <RESULT>TRANSACTION1TYPE</RESULT>
          </METHOD>
          <METHOD name="get2stTransactionaType">
               <RESULT>TRANSACTION2TYPE</RESULT>
          </METHOD>

</OBJECT>

</GYRUS>
```

Figure 14A

```
<TEXT_TEMPLATE>
<ANSWER> The current balance in your savings account is SAVEBALANCE dollars with and
the interest you have is five percent. </ANSWER>

<ANSWER> The current balance in your checking account is CHECKBALANCE dollars.</ANSWER <ANSWER> You deposited the amount of LASTDEPOSITCHECK dollars into your checking
   on LASTDEPOSITCHECKDATE. </ANSWER>

<ANSWER> The amount of the last deposit into savings was LASTDEPOSITSAVE dollars
   in LASTDEPOSITSAVEDATE. </ANSWER>

<ANSWER> Your last transaction was on LASTTRANSACTIONDATE and you made
   <LASTTRANSACTIONTYPE> the amount of LASTTRANSACTIONAMT dollars. </ANSWER>

<ANSWER> Your last three transactions in your checking account are:
On LASTTRANSACTIONDATE, you made LASTTRANSACTIONTYPE of
LASTTRANSACTIONAMT dollars. On TRANSACTION2DATE you made a TRANSACTION2TYPE
of TRANSACTION2AMT dollars. And on TRANSACTION1DATE, you made a
TRANSACTION1TYPE of TRANSACTION1AMT dollars. </ANSWER>

</TEXT_TEMPLATE>
```

Figure 14B

The current balance in your savings account is 10,000 dollars with and the interest you have is five percent.

The current balance in your checking account is 3,000 dollars.

You deposited the amount of 1,000 dollars into your checking on July 1st, 2002.

The amount of the last deposit into savings was 2,000 dollars in May 10th, 2002.

Your last transaction was on July 7th, 2002 and you made withdrawal for the amount of 3,000 dollars.

Your last three transactions in your checking account are: On July 7th, 2002, you made withdrawal of 3,000 dollars. On June 1st, 2002 you made a deposit of 1,000 dollars. And on May 20th, you made a withdrawal of 1,000 dollars.

```
<TEXT_TEMPLATE>
<ANSWER> The current balance in your savings account is SAVEBALANCE dollars with and
the interest you have is five percent.
    <URL "http://videoclips/compareotherintersts.video" </URL>
</ANSWER>

<ANSWER> The current balance in your checking account is CHECKBALANCE dollars.</ANSWER>

<ANSWER> You deposited the amount of LASTDEPOSITCHECK dollars into your checking
on LASTDEPOSITCHECKDATE. </ANSWER>

<ANSWER> The amount of the last deposit into savings was LASTDEPOSITSAVE dollars
in LASTDEPOSITSAVEDATE. </ANSWER>

<ANSWER> Your last transaction was on LASTTRANSACTIONDATE and you made
<LASTTRANSACTIONTYPE> the amount of LASTTRANSACTIONAMT dollars. </ANSWER>

<ANSWER> Your last three transactions in your checking account are:
On LASTTRANSACTIONDATE, you made LASTTRANSACTIONTYPE of
LASTTRANSACTIONAMT dollars. On TRANSACTION2DATE you made a TRANSACTION2TYPE
of TRANSACTION2AMT dollars. And on TRANSACTION1DATE, you made a
TRANSACTION1TYPE of TRANSACTION1AMT dollars. </ANSWER>

</TEXT_TEMPLATE>
```

APPARATUS AND METHODS FOR DEVELOPING CONVERSATIONAL APPLICATIONS

CROSS REFERENCE TO RELATED APPLICATIONS

This application claims the benefit of the provisional patent application No. 60/410,064 filed on Sep. 12, 2002.

REFERENCE TO A COMPUTER PROGRAM LISTING COMPACT DISK APPENDIX

Attached with the invention herein, there are two compact disks labeled "COPY 1 REPLACEMENT Jan. 7, 2004" and "COPY 2 REPLACEMENT Jan. 7, 2004." The contents of both such compact disks are identical. Such compact disks contain the software source code for a prototype of the invention herein and such files are in ASCII readable format. The files that comprised in both compact disks are the following:

PatentAppl60.410064: Main directory, which name denotes the patent application number, containing all sub-directories.

Src: A subdirectory under directory PatentAppl60.410064 and it contains all of the source code.

Com: A subdirectory under "src" containing all of the source code.

Gyruslogic: A subdirectory under "com" containing all of the source code.

Synsem: A subdirectory under "gyruslogic" containing all of the source code files responsible for processing the syntax of a natural language phrase and producing a semantic representation. Said source code represents the implementation of the Grammar Parser described further below in the Detail Description of the Invention in Section "Detail Description of the Grammar Parser with Augmented Semantic Information" and depicted in FIG. 1B, parts 102, 103 and 104.

VerbObject.java: created on Jan. 17, 2002. Java program containing the logic for loading verb related information into the object VerbObject. Size is 1.23 kbytes. Verb.java: created on Dec. 26 , 2002. Java program containing the logic for loading data from dictionary files "verbreg_master.txt" and "verbirreg_master.txt" into a hash of VebObject for further lookup. Size is 8.84 kbytes.

Noun.java: created on Dec. 26, 2002. Java program containing the logic for loading data from dictionary files "noun_master.txt", "nounsingular_master.txt", "nounplural_master.txt", "nounboth_master.txt", "nounproper_master.txt", "nounmass_master.txt" into a Hash structure of nouns for further lookup. Size is 7.42 kbytes.

WordLookup.java: created on Jan. 7, 2003. Java program containing the logic for loading into memory data from dictionary files "adjective master.txt", "beverbs.txt", "preposition_master.txt", "articles_master.txt", "possesive_master.txt", "cardinal_number_master.txt", "ordinal_number_master.txt", "auxiliars_master.txt", "auxiliars_participle.txt", "whword.txt", "months.txt", "numberlookup.txt", "personal_pronoun.txt". Size is 18.5 kbytes.

GrammarLoader.java: created on Dec. 26, 2002. Java program containing the logic for loading into memory the syntactical/grammar rules that are contained in a file. Size is 1.52 kbytes.

FileLoader.java: created on Dec. 26, 2002. Java program containing the logic for helping GrammarLoader.java read in the file that contains the grammar rules. Size is 1.92 kbytes.

DynamicGrammar.java: created on Aug. 30, 2002. Java program containing the logic for loading into memory the syntactical/grammar rules that are fed from a state transition as described below in this patent. Size is 2.71 kbytes.

RuleLeftSide.java: created on Jan. 6, 2003. Java program that contains the logic for evaluating the left side of a rule in said grammar and adding information to a string representing a conceptual structure as the left side of the rule is evaluated successfully with the given list of tokens. Size 4.04 kbytes.

PredicateList.java: created on Feb. 20, 2002. Java program that contains the logic for identified individual predicates that are logically ANDed together in the right side of the grammar rule and stores them into a list of predicates. Size 1.82 kbytes.

RuleRightSide.java: created on Jan. 18, 2002. Java program that contains the logic for evaluating the right side of a rule in said grammar and adding information to a string representing a conceptual structure as the right side of the rule is evaluated successfully with the given list of tokens. Size 2.49 kbytes.

GrammarRule.java: created on Nov. 12, 2001: Java program defined as Interface and is used as a generict type for defining rules in general using a property known in Java jargon as polymorphism. Size 366 bytes. Size is 1.59 kbytes.

GrammarRuleVerb.java: created on Nov. 12, 2001. Same as GrammarRule.java, but it is specific for verbs. Size is 394 bytes.

TerminalSymbol.java: created on Jan. 6, 2003. Java program that contains the logic for determining whether a terminal symbol has been reached during the parsing of a sentence and also determining to what part of speech the terminal symbol belongs to. Size is 9.8 kbytes.

Parser.java: Initially created on Jan. 7, 2003, but modified on Dec. 4, 2003 in order to fix a bug and not for adding new matter. Java program that takes as input a grammar and a string (the natural language phrase) and contains the logic for converting said string into tokens. It returns as output success Boolean codes if the parsing is successful by the grammar and a Semantic Tree. Size is 3.66 kbytes.

NLStatement.java: created on Feb. 22, 2002. Java program that takes as input a the a grammar and the natural language sentence in the form of a list of tokens and begins the evaluation of the sentence by comparing the traversing the list of tokens at the same time the grammar is traversed. It returns as output success Boolean codes if the parsing is successful by the grammar and a conceptual structure in the form of a string. Size is 1.71 kbytes.

Question.java: created on Dec. 17, 2002. Java program that takes as input a the a grammar and the natural language sentence in the form of a list of tokens and begins the evaluation of the sentence by comparing the traversing the list of tokens at the same time the grammar is traversed. It returns as output success Boolean codes if the parsing is successful by the grammar and a conceptual structure in the form of a string. Size is 1.36 kbytes.

SemanticTree.java: created on Jan. 14, 2002. Java program that takes as input a string representing a conceptual structure and converts it to a data structure Tree of objects, thereby returning a conceptual tree or namely a semantic tree. Size is 3.64 kbytes.

LispCons.java: created on Oct. 17, 2002 to help SemanticTree.java convert conceptual structure strings into a semantic tree. Size is 2.07 kbytes.

NumberParser.java: created on Nov. 19, 2002. Java program that takes as input a number as a natural language string (eg, "three hundred and sixty one") and converts it into a numeric string (e.g. a number such as "361"). Size is 3.61 kbytes.

Over10000.java: created on Dec. 1, 2002. Java program that helps parsing natural language string numbers that are over ten thousand. Size is 6.52 kbytes.

Over1000.java: created on Dec. 1, 2002. Java program that helps parsing natural language string numbers that are over one thousand. Size is 6.44 kbytes.

Over100.java: created on Nov. 1, 2002. Java program that helps parsing natural language string numbers that are over one hundred. Size is 2.98 kbytes.

Below100.java: created on Nov. 6, 2002. Java program that helps parsing natural language string numbers that are below one hundred. Size is 4.03 kbytes.

BasicNumber.java: created on Nov. 1, 2002. Java program that helps identify a basic natural number (from 0 through 9) in a natural language sentence. Size is 2.37 kbytes.

WildCard.java: created on Jan. 6, 2002. Java program that allows recognizing a word whether or not is in accordance with the grammar. Size is 651 bytes.

GyrusXML: A subdirectory under directory "PatentAppl60.410064\src\gyruslogic" containing all of the source code files responsible for processing two types of XML document: Answer templates and transaction files, both described further below in the Detail Description of the Invention in Section "Description of the Main Process and Interaction between the Different Parts of the System" and further depicted in FIG. 1B, parts 108 and 110, and FIGS. 9, 14A and 14B.

StateMachine.java: created on Aug. 31, 2002, but later modified in Oct. 27, 2003 for fixing a bug and not for adding new matter. Java program that parses the XML documents and builds a list of transactions (namely TranDialog objects) and a list of StateRecord objects for each transaction, with all associated information as expressed in the XML document and such objects are loaded in memory and made available for other programs. Size is 9.66 kbytes.

AnswerTemplate.java: created on Aug. 31, 2002, but later modified in Nov. 17, 2003 for fixing a bug and not for adding new matter. Java program that parses the XML documents and builds a list of textual answers, and such answers are loaded into memory for later retrieval. Size is 4.39 kbytes.

GyrusClassLoader.java: created on Aug. 31, 2002, but later modified on Oct. 27, 2003 for fixing a bug and not for adding new matter. Java program that takes in a class name, parameters and methods of the class and calls a third party application using procedure known as Reflection. Size is 2.95 kbytes.

ReturnedResult.java: created on Sep. 7, 2002. Java program that captures the result returned by a third party application within the above program GyrusClassLoader.java. Size is 654 bytes.

UserMethod.java: created on Nov. 22, 2002. Java program that holds the methods found in a given class of a third party application and helps GyrusClassLoader calling said methods. Size is 1.69 kbytes.

Transmgr: A subdirectory under directory "PatentAppl60.410064\src\gyruslogic" containing all of the source code files responsible for processing exact requests or transactions and implements the state transition inference engine described below in the Detail Description of the Invention under this specification in Section "Detail Description of the State Transition Inference Engine Subsystem and Accompanying Method for Supporting Natural Language Conversations" and further depicted in FIG. 1B, part 107.

Confirmation.java: created on Feb. 12, 2002. Java program that determines if a natural language request is the answer to a confirmation. Size is 2.58 kbytes.

StateRecord.java: created on Dec. 18, 2002. Java program that holds information in memory of a State, such as the states described in the Detail Description of the Invention under this specification. Size is 4.45 kbytes.

TranDialog.java: created on Dec. 18, 2002, but recently modified on Dec. 23, 2003 for fixing a bug and not for adding new matter. Java program that holds in memory the contents of an exact request, including its states, call definitions to third party applications, and confirmation prompts. Size is 11.1 kbytes.

TreeMatch.java: created on Aug. 25, 2002 but later modified on Oct. 27, 2003 for fixing a bug and not for adding new matter. Java program that pattern-matches the States in a Transaction with a semantic tree returned by Parser.java, by traversing the semantic tree. Size is 10.6 kbytes.

SessionFile.java: created on Oct. 13, 2002. Java program that reads the transaction and states either from a transaction already in memory if it already exist for a given session, or from the StateMachine.java if there is not any transaction in memory. Size is 3.11 kbytes.

TransactionMgr.java: created on Aug. 25, 2002, but recently modified on Dec. 12, 2003 for fixing a bug and not for adding new matter. Java program that retrieves all the information associated to an exact request and its corresponding states through SessionFile.java. TransactionMgr.java also takes as input a session ID and a Semantic Tree and uses TreeMach.java for pattern matching the states in the exact request with the structure of the tree as described in the Detail Description of the Invention. TransactionMgr.java also makes further inspections in the user request to see if it really is an exact request, a new exact request, a follow up from a previous request, and confirmation within the exact request or a correction to the existing request. It makes further decisions if the request is indeed an exact request but the patter matching with the states fails. Size is 6.05 kbytes.

gyrusfaq: A subdirectory under directory "PatentAppl60.410064\src\gyruslogic" containing all of the source code files responsible for processing fuzzy or ad-hoc requests from third part applications and implements the Heuristic Answer Engine described below in the Detail Description of the Invention under this specification in Section "and further depicted in FIG. 1B, part 106.

Knowledge.java: created on Feb. 7, 2003 but later modified on Nov. 23, 2003 for fixing a bug and not for adding new matter. Java program that uses GyrusClassLoader.java for executing a third party application as specified in an answer template xml file and fills in the variable slots in the answer template that were returned from the third party application. Then it constructs textual answers customized to a specific user session. Size is 3.23 kbytes.

URLReader.java: created on Dec. 30, 2002. Java program that reads in a set of answers from a URL location if an answer template is not provided. Size is 962 kbytes.

OntoFactory.java: created on Dec. 26, 2002. Java program that loads into memory a map of ontological categories and words. Size is 1.28 kbytes.

WordTransformer1.java: created on Dec. 17, 2002. Java program that tags every recognizable word in the set of answers with an ontological category by using OntoFactory.java. It takes as input a set of answers and it returns a new document with ontological categories. Size is 962 kbytes.

Document.java: created on Jan. 03, 2002. Java program that holds in memory vectors of words from a text as a Document object. Size is 614 bytes.

BestParagraph.java: created on Dec. 17, 2002. Java program that selects the best phrase or paragraph from those containing the subject. It categorizes groups based on matches found in the parts of speech and semantic components of the natural language query. The group that best resembles the structure of the Semantic Tree is the best answer. This program then returns the best answers based on such groups, ordered by weight. Size is 15.4 kbytes.

TreeHelper.java: created on Dec. 17, 2002. Java program that walks down the structure of a Semantic Tree at the same time that inspects a Document in order to measure how much such a document resembles the Semantic Tree, based on offset distances between in different objects in the Document, such as it is described in the Detail Description of the Invention under this specification. Size is 10.3 kbytes.

TextSearch.java: created on Dec. 30, 2002. Java program that uses BestParagraph.java in order to retrieve the paragraph with the best answer, but it also delimits the offset positions of the best answer in the paragraph. Size is 1.9 kbytes.

BestAnswer.java: created on Feb. 7, 2003. Java program that takes and input a question in the form of Semantic Tree and a table of ontological categories. It then uses WordTransformer1.java for tagging a document with ontological categories and it uses TextSearch.java for searching and retrieving a set of answers. It returns a set of answers. Size is 1.66 kbytes.

AnswerConfidence.java: created on Nov. 14, 2001. Java program that, based on the heuristic values added up through the heuristic search, as explained in the Detail Description of the Specification, provides the level of confidence in which is an answer is given. Size is 3.01 kbytes.

gyrusserver: A subdirectory under directory "PatentAppl60.410064\src\gyruslogic" containing all of the source code files responsible for interacting with all the major parts of the system, mainly the Grammar Parser, the Heuristic Answer Engine and the State Transition Inference Engine and implements the Main Process Broker and Client as described below in the Detail Description of the Invention under this specification and in Section "Description of the Main Process and Interaction between the Different Parts of the System" and further depicted in FIG. 1B.

Server.java: originally created on Dec. 30, 2002, but recently modified on Dec. 12, 2003 for fixing a bug and not for adding new matter. Java program that interacts runs as a service listening to a port number through TCP/IP. It interacts with Parser.java, passing as input different grammars (namely user grammars and system grammars) and receiving a Semantic Tree. Based on such interaction with Parser.java, Server.java also determines whether the request is fuzzy or exact. Depending on the nature of such requests, Server.java makes decisions whether to interact with TransMgr.java or BestAnswer.java, by passing as input a Semantic Tree provided from Paser.java. Based on the output from BestAnswers.java and TransMgr.java, it forms a Response object with a set of answers, which returns back through the aforementioned port number and TCP/IP. Server.java is multi-threaded so that it can handle multiple requests at the same time. Size is 16.1 kbytes.

Client.java: originally created on Dec. 30, 2002, but recently modified on Dec. 12, 2003 for fixing a bug and not for adding new matter. It connects with Server.java through TCP/IP and as illustrated on FIGS. 1A and 1B. It sends Requests (Request.java class) to the Server (Server.java class), and receives Responses (Response.java class) from the Server. Size is 4.92 kbytes.

Response.java: originally created on Dec. 30, 2002, but recently modified on Dec. 11, 2003 for fixing a bug and not for adding new matter. It contains the information in a response to the Client from the Server. Size is 7.08 kbytes.

Request.java: originally created on Dec. 30, 2002, but recently modified on Dec. 11, 2003 for fixing a bug and not for adding new matter. It contains the information in a request from the Client to the Server. Size is 5.02 kbytes.

RequestIdentifier.java: originally created on Dec. 30, 2002, but recently modified on Dec. 11, 2003 for fixing a bug and not for adding new matter. It helps in identifying whether a request is an exact request or a fuzzy request. Size is 6.81 kbytes.

util: A subdirectory under directory "PatentAppl60.410064\src\gyruslogic" containing all of the source codes of programs that help the other programs perform houskeeping tasks, such as message logging, or cashing file addresses, or loading prompts, or loading configuration parameters. This subdirectory and its contents are irrelevant to the Detail Description of the Specification.

Logger.java: created on Dec. 17, 2002. Java program that performs message logging. Size is 7.59 kbytes.

UrlCach.java: created on Nov. 14, 2001. Java program that olds URL addresses in memory. 4.43 kbytes.

CachelnputStream.java: created on Nov. 14, 2001. Java program that reads a stream from UrlCache.java. Size is 1.83 kbytes.

Util.java: created on Nov. 14, 2001. Java program that works as a helper of CachelnputStream.java and UrlCach.java and returns a full url address given a url key. 401 bytes.

Configuration.java: created on Jan. 17, 2002. Java program that reads in configuration parameters from a configuration file and keeps them in memory. Then it returns the parameter value to other programs based on a parameter key. Size is 1.52 kbytes.

SystemPrompt.java: created on Nov. 23, 2003. Java program that reads in all prompts to be used in the program from a prompt file and keeps them in memory. Then it returns the prompt value to other programs based on a prompt key. Size is 1.39 kbytes.

gyrusexamples: A subdirectory under directory "PatentAppl60.410064\src\gyruslogic" containing all of the source code example of a third party application called from an XML file and with whose interaction is described below in the Detail Description of the Invention and further depicted in FIG. 1B, part 109, FIGS. 9, 14A and 14B.

BankingDemo.java: created on Oct. 21, 2003, in order to illustrate the Patent Examiner how a third party application returns information and process transactions that are accessed by the invention herein. Size is 15.5 kbytes.

Languages: A subdirectory under directory PatentA ppl 60.410064 and it contains subdirectories with information related to a specific language with supporting files and dictionary English: A subdirectory under directory PatentAppl60.410064\Languages and it contains supporting files and dictionary files specific to the English language.

SysGrammar.gram: created on Mar. 11, 2001, but recently modified on Nov. 5, 2003 for the purpose of inserting additional grammar rules and not for adding new matter. It contains a set of semantically augmented syntactical grammar rules as described in the Detail Description of the Specification and further depicted in FIG. 1B, part 103, and in particular it is further described in Section "Detail Description of the Grammar Parser with Augmented Information" and further depicted in FIG. 5. Size is 11 kbytes.

ONTOS.txt: created on Mar. 11, 2001, but recently modified on Nov. 15, 2003 for the purpose of inserting additional words and not for adding new matter. It contains a mapping between words and their corresponding ontological categories. Size is 10.3 kbytes.

Adjective_master.txt: created on Feb. 13, 2002 and contains a comprehensive list of adjectives for English. Size is 35.8 kbytes.

Adverb_master.txt: created on Mar. 14, 2001 and contains a comprehensive list of adverbs for English. Size is 1.44 kbytes.

Article_master.txt: created on Jan. 21, 2002 and contains articles for English. Size is 29 bytes.

Auxiliary_master.txt: created on Nov. 17, 2002 and contains auxiliary verbs for English. Size is 55 bytes.

Auxiliary_participle.txt: created on Nov. 17, 2002 and contains auxiliary verbs used for constructing the participle form in English. Size is 14 bytes.

Beverbs.txt: created on Jan. 30, 2002 and contains the conjugations of the verb "to be". Size is 22 bytes.

Cardinal_number_master.txt: created on Mar. 11, 2001 and contains the cardinal form of a number in English. Size is 243 bytes.

Conjunction_master.txt: created on Mar. 11, 2001 and contains words that are used for constructing a conjunction in English. Size is 102 bytes.

Months.txt: created on Feb. 21, 2002 and contains the twelve months of the year in English. Size is 98 bytes.

Natural_number.txt: created on Feb. 9, 2003 and contains the numbers from zero through 9 in English. Size is 64 bytes.

Noun_master.txt: created on Jan. 30, 2002 and contains a comprehensive list of English nouns in singular form. Size is 74.9 kbytes.

Nounboth_master.txt: created on Mar. 11, 2001 and contains a comprehensive list of English nouns in singular form that can also be verbs. Size is 86 bytes.

Nounmass_master.txt: created on Jan. 21, 2002 and contains a comprehensive list of English mass nouns. Size is 494 bytes.

Nounplural_master.txt: created on Jan. 18, 2002 and contains a comprehensive list of English nouns in plural form. Size is 62.8 kbytes.

Nounproper_master.txt: created on Mar. 11, 2001 and contains a list of proper names. Size is 1.77 bytes.

Nounsingular_master.txt: created on Mar. 11, 2001 and contains a comprehensive list of English nouns that have only singular form. Size is 162 bytes.

Numberlookup.txt: created on Jun. 29, 2002 and contains a mapping between numbers and their corresponding English written form. Size is 343 bytes.

Ordinal_number_master.txt: created on Mar. 11, 2001 and contains ordinals in English. Size is 308 bytes.

Personal_pronoun.txt: created on Feb. 11, 2003 and contains English personal pronouns. Size is 50 bytes.

Possessive_master.txt: created on Aug. 1, 2001 and contains English possessive pronouns. Size is 32 bytes.

Prespositionmaster.txt: created on Mar. 11, 2001 and contains a comprehensive list of English prepositions. Size is 412 bytes.

Prompts.txt: created on Nov. 30, 2003 and contains system prompts. Size is 714 bytes.

Pronoun_master2.txt: created on Nov. 7, 2003 and contains English pronouns. Size is 243.

Verbirreg_master.txt: created on Mar. 11, 2001 and contains a comprehensive list of English irregular verbs their different conjugations. Size is 6.76 kbytes Verbregmaster.txt: created on Mar. 11, 2001, but recently modified on Nov. 6, 2003 for the purpose of inserting additional verbs and not for adding new. It contains a comprehensive list of English regular verbs. Size is 37.7 kbytes.

Whword.txt: created on Jan. 30, 2002 and contains a list of words that are used to begin a question in English. Size is 34 bytes.

Example: A subdirectory under directory PatentAppl60.410064 and it contains the files for an XML example application that can utilize the invention herein as described in the Detail Description of the Specification.

Gyrusanswers.dtd: Created on Sep. 7, 2002 (size 288 bytes). An XML schema for the XML answer templates.

Gyrusstates.dtd: Created on Oct. 4, 2002 (size 577 bytes). An XML schema for the XML exact request definitions.

Banking: A subdirectory under directory PatentAppl60.410064\Examples and it contains example XML files and user grammar specific for a banking applications.

BankGrammar.gram: Created on Oct. 29, 2003 (size 4.07 kbytes). A user grammar for a banking application.

BankStates.xml: Created on Jan. 2, 2004 (size 1013 bytes). User exact requests defined by a user for a specific banking application.

BankingAnswers.xml: Created on Oct. 29, 2003 (size 5.01 kbytes). User answer template that maps answers to a user's third party application. In this case the third party application is the source described above, namely BankingDemo.java.

Bankdata.txt: Created on Dec. 30, 2003 (size 1.04 kbytes). A simple bank database used by the program BankingDemo.java.

Gyrus.ini: Created on Oct. 18, 2003 (size 311 bytes). A configuration file with configuration settings.

BACKGROUND OF THE INVENTION

1. Field of the Invention

The present invention relates, in general, to data processing systems, and in particular to the area of natural language processing, computational linguistics and speech recognition.

2. Description of Prior Art

One of the challenges every natural language system faces is trying to map the syntax of a complex natural language request to its meanings and ultimately, mapping those meanings to existing computer applications, which execute transactions and queries in a company's information system.

There exist systems capable of parsing complex natural language syntax and convert it to some semantic framework, like predicate calculus, lisp cons, semantic nets, frames, etc. However, the question always remains of how to translate the semantic structure into computer queries or commands that can reuse existing commercial applications and databases that are proprietary to a specific business. The software developer then usually opts to abandon such natural language interfaces and develops a dialog flow from scratch using Java, C++ or Voice XML. The dialog is then designed for the specific application, but it tends to limit the user to specify only simple commands For a number of years researchers in the artificial intelligent field have developed systems that appeared to maintain text based conversations with humans. Going back to 1966, an M.I.T. professor, Joseph Weizenbaum, created Eliza as a "virtual therapist". It would take a user's statement and turn it around as a question, emulating psychiatrists' therapy techniques. In recent years, similar systems have been developed, such as Alice, by Richard Wallace, at the New York University [Thomp02]. These systems are strictly specific to the domain or application they are designed for. They are not scalable to other applications and not ready for the commercial arena. Another problem associated with these types of systems is that it takes many years to develop. A business that wants to provide customer support to its users may not be able to afford a team of researchers from MIT to develop a virtual customer support agent through the course of several years. Another problem with these traditional conversational systems is that they are not designed to interact with existing databases or applications. They are typically self-contained and for the most part only suited for research.

Prior art is available for developers to program dialog flows for the purpose of constructing voice enable systems in telephony applications, but the resulting dialog capabilities tend to be limited to simple voice commands. For example, the VoiceXML language was invented for this purpose. However, trying to develop with VoiceXML a conversational dialog that also allows for complex natural language requests, although it may be possible, it would be a daunting task and the cost would be much higher than the average software application. The developer has to account for all possible outcomes of the user's utterances and build a reply for every possible situation, which would be virtually impossible since the potential sentences that a user can provide are unpredictable. This dialog has to be paired with complex business logic at the application level, in order to support all such possible outcomes. The result is a rigid and proprietary application. Voice-enabled applications today are like old transaction systems written in COBOL during the days when relational databases didn't exist. In many cases, the cost of developing the dialog flow doesn't justify the return on investment.

In addition, current VoiceXML based systems lack the capability to handle spontaneous requests and interruptions in the dialog. Again, they are guided by a rigid dialog flow.

Some prior arts are capable of retrieving answers from documents to user questions, and some times these questions can be phrased with complex natural language, but such systems are capable of only answering questions from digital documents, and/or databases of documents. Such capability can be found in recent U.S. Pat. Nos. 5,873,080 5,953,718 5,963,940 5,995,921 5,836,771 and 5,933,822. Although these answer retrieval systems can retrieve information from documents, they cannot be programmed to execute existing re-usable applications and/or databases. In addition, with these systems users are not able to request transactions in natural language, such as a hotel reservation or a transfer of funds. They are incapable of performing a transaction, because such systems can only answer questions from information existing in digital documents.

In the late 80's and early 90's attempts were made to map natural language to SQL (Sequence Query Language) for the retrieval of information from relational databases, but this attempt proved to be futile. Too many times the resulting SQL statements were wrong. Other times, the natural language phrase could not be converted to SQL. The number of natural language queries that the system could convert to the same SQL statement was limited and even finding all the variations of such natural language statements was an exhausting process. For the most part the users were highly limited on what they could phrase and how to phrase it [Ruwan00] (also see U.S. Pat. Nos. 5,197,005 5,265,065 5,386,556 5,442,780 5,471,611 and 5,836,771). In any case, even when some of these projects may have partially succeeded, they are strictly limited to relational database access, which many times it is the least preferred way to execute transactions from the user interface. In today's systems, it is preferable for the user interface to have the flexibility to execute transactions and/or queries through an application layer.

Some prior arts employ state machines to guide the dialog, such as in U.S. Pat. No. 6,356,869. While such state machines are able to prompt the user as they discover new information in the database based on user queries, they are not able to identify the information that is missing from the user's request, in order to complete a query or a transaction, and to guide the user accordingly.

Prior arts also fail to adapt to the level of precision in which humans provide natural language requests. Prior art can perform one of the following functions:

Guide the dialog under presumed logical precision as seen in U.S. Pat. No. 6,356,869 and U.S. Pat. Nos. 5,197,005 5,265,065 5,386,556 5,442,780 5,471,611 and 5,836,771. Such prior art requires precision in the user's request and can only either deliver with precision or cannot deliver at all.

Search for information stochastically and/or heuristically, and deliver information approximated to the user's request. Such are U.S. Pat. Nos. 5,933,822 5,995,921 5,953,718.

Prior arts are not designed to distinguish between precision and imprecision, and cannot process the request accordingly. They can do either one or the other, but not both. We viewed these precision and imprecision categories as different types of communicative acts. In addition, there are other communicative acts that appear in natural language discourse. In general prior arts have a difficult time distinguishing between different kinds of communicative acts and how they are linked together, of if they are linked at all.

Additionally, the prior arts referenced herein are not designed to be integrated with each other. Each prior art merely tries to solve a single problem in the field of natural language processing. Yet, a natural language dialog, that would be common between humans, can challenge any of the prior arts individually with a variety of problems. That is, there is not one single prior art that can solve enough natural language problems necessary to maintain true natural conversations with humans and, at the same time, interact with third party software application systems.

In the area of dialogs with voice using Speech Recognition and Text-To-Speech interfaces, we have already pointed out the problem of building a complex dialog with the tools that are currently available. Other problem associated with building applications that include voice, is the accuracy of the speech recognition interface. The speech recognition interface can only rely on the phonetic algorithms provided by the speech recognition engine and the grammar provided by the developer in order to transcribe utterances to text. But both, the speech recognition algorithms and the grammar are not enough for the speech recognition to be accurate. Employing semantics and context in validating the accuracy of the produced text would greatly help the speech recognition process to be more accurate.

Another problem associated with building applications that include voice is the fact that they can only be used with a voice interface. That is, such applications are hard-wired to the telephony application and to the existing company's IVR (Interactive Voice Response) infrastructure. They are not designed to be used with other media, such as a web browser. Text based interaction is still important because it allows users to interact via a web browser or with an instant messenger. An up and coming technique currently being used for providing customer support is service through an "instant messenger", which allows customers to interact with a customer representative agent using text chatting. This invention provides automated chatting, as it would take workload off existing agents and it would translate to great savings for businesses, as it would allow companies to expand customer support without having to increase the work force. But this automated chatting would be most useful if the same system that serves text-based chatting can also serve the voice-enable telephony application, thereby providing conversational capabilities in either media.

SUMMARY OF THE INVENTION

Objectives of the Invention

Therefore, we see that there exists a need for systems that provide service through natural conversations as that provided by humans who have the ability to access computer applications, at the same time they provide such a service (for example, bank tellers, travel agents, help desk). In addition, the need exists for allowing an average software developer to build such systems within a reasonable time that makes it cost effective. It would be further desirable that such needed systems would be able to:

1—Distinguish between different communicative acts.

2—Understand phrases that require the execution of a transaction reusing existing applications and databases.

3—Identify from a user's natural language request, which information is provided and which information is missing and to further request the user for information.

4—Retrieve answers, not just from digital documents, but also by leveraging existing applications and existing databases and can also tailor those answers to a particular user.

5—Perform both transactions and answer retrievals (to questions).

6—Adapt to precise requests and vague requests and process such requests accordingly. In this sense, the system must also decide if the vague request requires further clarification by the user or if it can go ahead and provide the best possible answer to still fulfill most of the user's needs.

7—Allow the user to be spontaneous in conversations. In effect, the user should be able to drive the dialog at will and not be subjected by prompts and on what he/she can say or not say at a given time. For example, a user should be able to interrupt the machine in the middle of a conversation and request something else. Then he/she should be able to come back to the point where the dialog was interrupted.

8—Make the development of the conversational dialog reasonably easy and practical for commercial application, regardless of the type of business or application.

9—Be used with text or voice, that is, the same system should be used from a web interface or a speech interface.

10—Be viable in a speech driven environment (speaker independent), that is, it makes conversation between a human and a machine, using speech, a practical reality. It can also leverage the power of semantics and context created by the system, to improve the speech recognition when used together with a speech recognition interface.

In general, there exists a need for an apparatus capable of maintaining unrestricted conversations with human beings, without imposing on such humans what they can say or cannot say and lets users be spontaneous in their conversation, while at the same time such apparatus is capable to interface with existing information systems. Being able to easily interface with existing applications and databases is essential, in order for a system to be commercially practical; otherwise, as it usually happens, it would not leave the realms of research. At the same time, such apparatus must be easily configurable by an average programmer trained in the operation and configuration of such apparatus, so that the return of investment clearly exceeds the development effort.

BRIEF SUMMARY OF THE INVENTION

The above and other objects are achieved with a set of parts that comprise the system described herein.

In order to achieve maximum conversational potential, the main embodiment of this system follows a simple principle in the human brain. The human brain is divided in two main sides, the left side and the right side. The left side is said to be better suited for logical precision and analytical thought. In contrast the right side is said to be, although still logical, better suited for heuristic, intuitive and sometimes fuzzy thought processing. The system herein contains two important subsystems that follow the same principle of the brain: One subsystem processes requests that are considered vague or fuzzy, but can be fulfilled with the best possible answer even if it is not the perfect answer. Another subsystem processes requests that are considered to require exact answers or to process transactions where there is no room for error. The system described herein also includes a third subsystem that makes decisions for whether the request from the user can be fulfilled with a non-exact answer or it requires an exact answer, without having to ask the user. This subsystem contains a linguistic algorithm that processes the syntax and semantics of a natural language sentence. This subsystem also teaches us how to convert natural language sentences into conceptual structures that are used for, either answering questions or perform transactions. A main process broker is responsible for coordinating the subsystems, manage the flow of information between the subsystems and it is also capable for tuning speech recognition by means of semantic analysis and context analysis.

It will also be apparent that the system analyzes he user request and determines if all or some information has been provided to execute the transaction and what information has been excluded. Then it asks the user for further information when information is missing. This capability is managed by a subsystem, which is referred below as a state transition inference engine and it is implemented in a computer program.

In dealing with fuzzy or vague questions, the invention discloses a method for answering user questions and leveraging existing applications and/or database repositories. This method is part of a subsystem, which is referred below as a heuristic answer engine and it is implemented in a computer program. The heuristic answer engine reads into memory a digital document with a template of answers, which consists of narrative answers with variables, where each variable maps to a data value in a company's database. The document also reserves an area to map the variables to the company's application interface that retrieves the data value. The heuristic answer engine first executes the calls to the application interface and fills in the variables with the corresponding data values and thereby constructing a text that contains all possible relevant answers that apply to a specific user's needs. Such a text resides in memory and contains all possible answers that can be provided to a specific user. When the user asks a question, a parser processes the natural language request and builds a tree of objects, each object containing rich semantic information about the sentence and the word contained in the sentence. The answer engine uses the tree structure and the text of answers and begins to traverse the tree at the same time that searches the text. For every part of speech and meaning encountered in the tree, the answer engine attempts to find the same match in the document. The search for a match inside the text must conform to a heuristic algorithm that is driven by the structure of the tree. The sections of the document that best fits the heuristic criteria are then retrieved as answers.

Multiple answers may be found in the same document, each with a score that describes how close the answer is to the intended question. The answer with the highest score wins and it is returned to the user. Due to the fact that the program uses a heuristic algorithm, the answers may not be perfect, but they may be close enough to satisfy the users' request. This allows developers to address very quickly a large number of requirements that have to do with querying information. The implementers of a conversational system only need to map answers to his company's application interface in order for the system to answer a majority of the questions. It will become apparent in the detail description below, that the system retrieves answers, not just from documents, but also by leveraging existing applications and existing databases and can also tailor those answers to a particular user. In addition, it can still provide answers when the user's question is vague thus letting the user realize that he needs to be more precise in the request. In many cases, however, even when the user's question is vague, the answer can satisfy the user's needs 100%.

The invention discloses a method for processing natural language requests that require the exact retrieval of information or perform transactions where there is no room for heuristics algorithms or fuzziness. In order for the apparatus to process transaction requests, the implementers have to build a state transition system that is to be processed by a state transition inference module. The implementers must also build a grammar for each natural language request that must be translated to a transaction. The grammar and the state transition system are linked together via a transaction name and ontological categories that are placed at the beginning of a group of grammar rules. Each ontological category exists at the head of each state. A set of states represents a transaction. Each state is activated when a piece of information is missing from the request. Each piece of information is headed by an ontological category. When a state is activated, it prompts the user to provide further information. Once again the user would provide the information in natural language. After the user has provided all the information required for performing the user's request, no states can be activated and the transaction is executed via an existing application or database. It will become apparent in the detail description, that the system understands phrases that require the execution of a transaction and at the same time it can re-use existing applications and/or databases.

The system herein contains a grammar parser (or parser generator), multiple grammars and dictionaries, which provide information for processing the syntax and the semantics of a sentence and at the same time, it builds a conceptual structure. This grammar parser also decides whether the request can be fulfilled with the answer engine or with the state transition inference engine. The generated conceptual structure, which comes out in the form a tree data structure, is used by either the heuristic answer engine or the state transition inference engine. Depending on the results provided by the grammar parser, a main process broker decides whether the user's request qualifies as a fuzzy query dr as an exact query/transaction. If the user's request is a fuzzy query, the main process broker sends the conceptual structure to the answer engine for further processing. If the user's request is an exact query/transaction, the main process broker sends the conceptual structure to the state transition inference engine.

In a different embodiment of the invention, other engines are added for handling other types of requests besides fuzzy requests and exact requests, such an engine that handles superfluous phrases (e.g. "Oh well", "What the heck!").

When used with a speech recognition interface, the system can read in multiple orthographic transcriptions fed by the speech interface. Some orthographic transcriptions may be wrong and only one is right. Each transcription is sent to the various parts of the system. Different scores may be returned by the different parts of the system, in which case, the system makes an assessment of the validity of the transcriptions. If the score is acceptable, it follows that the orthographic transcription is in context and therefore a valid recognition.

When all the above subsystems are working together, it will become apparent in the following detailed descriptions that a conversational customer support system is possible for humans interacting in natural language with company's proprietary information. The perception to the user is that he can be spontaneous about what request wants to make at any given time, and that either the system is answering his questions or is asking the user to provide more information. When the system decides to provide an answer using the heuristics answer engine, the answer may not completely satisfy the user's needs, in which case, the user will intuitively try to be more specific about his question in order to obtain a more specific answer. In other cases, the user may just provide superfluous sentences, which don't trigger any query or transaction; yet, the system reacts accordingly and recognizes the request. During a professional interaction, no further dialog is required. At the end, the system has been capable in providing support through natural conversation.

It will also be apparent that the system herein, maintains complex dialog with humans at the same time that interacts with third party software applications and it is easily customizable by an average programmer trained to use the system.

BRIEF DESCRIPTION OF THE DRAWINGS

FIG. 5: A grammar portion of the English language in augmented BNF (Backus-Naur Form).

FIG. 6: Sample sentences that can be parsed and accepted by the grammar of FIG. 5.

FIG. 8A: Example of a BNF user grammar, that is, a grammar built by software developer or analyst for the purpose of customizing a conversational application using this invention.

FIG. 8B: Another BNF user grammar.

FIG. 9: Example of a transaction file for transferring funds and to be used by the State Transition Inference Engine.

FIG. 10: Example of a conceptual structure for the phrase: "transfer $100 from my savings account to my checking account"

FIG. 13: Example of a transaction for hotel reservations and to be used by the State Transition Inference Engine.

FIG. 14A: First part of an answer template showing the values being map to a third party application.

FIG. 14B: Second part of the answer template showing the template of answers with the values to be filled.

FIG. 15: A customized text, which contains all possible answers that could be produced by the answer template in FIGS. 14A and B and specific for a particular user.

FIG. 18: The same as in FIG. 14B with the URL tag.

DETAIL DESCRIPTION

Terminology

Figure 1A:
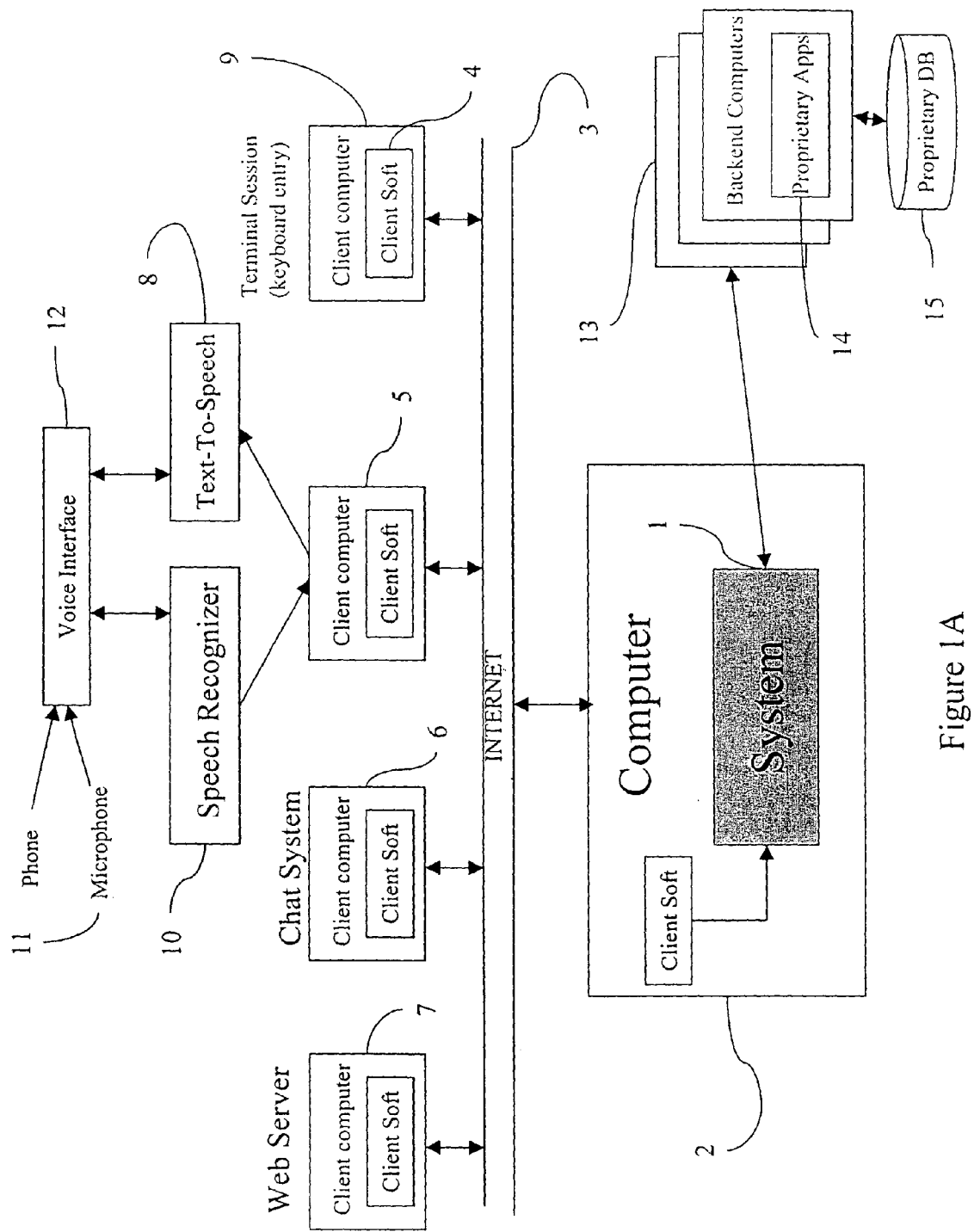
FIG. 1A: A very high-level block diagram showing different systems interacting with the invention and where the invention resides in the context of an information system.

Unless we specified the type of system being referred to, such as a "database system", an "airline information system", etc, whenever the term "the system" or "the apparatus" is used, we referred to the system described under this invention.

Unless otherwise stated, the term "proprietary API" and "proprietary application" should be taken to mean either an application layer or a database system that it is proprietary to any business unit or to a third party software. The system described in this invention is therefore intended to re-use other third party software or applications that already perform certain functions of a business, such as transactions or queries. Any of such transactions or queries that may already exist in a business or a third party software should be considered as part of the "proprietary API". Examples of third party software that fall under this category are all those known as web services (such as WebSphere® and WebLogic®) database software (such as Oracle® and DB2®) and industry specific software (such as Sabre®). An example of a proprietary database, specific to a business unit, is a guest database for a hotel chain. In the description of this invention it is always assumed that the "proprietary API" already exists prior to programming the system herein.

Unless otherwise stated, the term "proprietary API", "proprietary application", "third party application", "third party application program" and "third party application software" shall have equivalent meaning in this invention.

Unless otherwise sated, the terms, "conversation", "dialog" and "discourse" shall have equivalent meanings and shall be equally interchanged.

Unless otherwise stated, in this invention when the term "grammar parser is used", we mean "parser generator". In effect, the parsing rules change dynamically every time the program reads in a new grammar. This technique is also known in the jargon of computational linguistics as "tree adjoining grammars"

General Usage of the System

The system described under this invention is equipped with a programming interface that must be programmed accordingly by an analyst or programmer in order for the system herein to perform as a natural language interface. It is assumed that the system herein is to be used with an existing application or database that already processes without a natural language interface, certain functions of a business. For example, a hotel reservation system may already be present in a hospitality business and the existing user interfaces may be a web interface, a telephony interface that accepts requests via the touch tone, and a visual interface that is used by the operators in a call center.

In a typical data processing application, an analyst identifies what information is required to provide to users and what transactions are to be performed. For example, in a banking application, the requirements may call for allowing users to transfer funds from one account to another account. The requirements may also specify that users can request their account balances, their last transactions and the last deposit. They can also request information on whether a particular check has cleared.

In a typical data processing system the objective is to provide the best user satisfaction with the least development cost. In the system described under this invention, the analyst must decide what requests require 100% accuracy and which ones do not. Requests that are vague do not need to be answered with 100% accuracy. For example, if a user asks for his account balance, the question is vague because he does not say whether he wants his savings account balance or his checking account balance. The requests that do not require 100% accuracy can also be answered with fuzzy answers. For example, if a user asks for the last 100 transactions, this request may be fulfilled, as far as the bank is concerned, with just the last five transactions because that is all the bank may be able to provide.

Fuzzy answers may or may not have 100% accuracy, but enough accuracy to satisfy a user's request. In many applications, the majority of the answers can be a bit fuzzy. Users may expect the best approximation to satisfy their request, as long as the information provided is truthful. Ideally, when users ask questions they want answers with the greatest accuracy and completeness. However, most users understand that reality is not as exact. When not all the information is available, users prefer some information rather than no information. For example, let us consider what happens when a user asks for the last hundred transactions in a banking application. The bank policies may restrict the users to asking no more than five transactions. In this case, exactness in the system would be an impediment because an exact system may be incapable to provide an immediate answer to the user's request. The business logic would have to be implemented in order to verify that the number of transactions does not exceed the number stated by the policy. A dialog flow would also have to be developed in order to tell the user that the maximum number of transactions is five and would ask him to repeat the request. The system would also have to deliver exact number of transactions to the user's request. If the user asks for two transactions, the system must respond with no more and no less than two transactions. Instead, a fuzzy system takes into account that providing any information is better than no information. If the user asks for only the last two transactions and the system returns the last five, no harm is done. Likewise, if the user asks for the last hundred transactions, but the system provides five, no harm is done either because the system is providing the best information that it can provide. Therefore, even specific questions where the user is asking for a particular number of transactions can be treated as fuzzy.

In the banking case study, the analyst may also decide that asking for the "account balance" is vague and can also be addressed with fuzzy answers. For example, a user may ask, "what is the account balance?" and not being specific about which account. If we treated this request as exact, we would have to construct the dialog that prompts the user: "The balance of which account, savings or checking?" However, a fuzzy system may provide the balance of one of the accounts, for example "savings". Again, since the user did not specify whether he wanted "savings" or "checking", the system answers with a balance from one of the accounts and hopes to be the account that the user wants. If instead, the user meant "checking", the user would intuitively realize that he has to be more specific and might then request: "What is the balance of my checking account?" As a simple analogy, this is a similar interaction a user experiences when querying the Internet using a search engine. The search engine tries to do the best to deliver the answer sites. If the returned sites don't satisfy the user's needs, the user intuitively refines the search criteria. As pointed out above, the objective is to provide the best user satisfaction with the least development cost. For better usage of the system herein, putting as many queries as possible in the fuzzy category speeds up greatly the development time because there is no need for developing complex business logic and dialog flows. At the same time, the user satisfaction is high because he gets what he wants for the most part, and he is not aggravated by further prompts.

There are certain requests, which under no circumstances, can be treated as fuzzy. Such are requests that are specific to a value or that can be translated into a specific transaction. For example, in the banking case study the analyst also determines that the only two requests that require exact processing is "transferring funds" and "requesting whether a particular check has cleared". In both of these cases, there is no room for fuzziness. The transfer of funds must take place exactly in the manner desired by the user. Likewise, the information about a particular check must be exactly by the check number specified.

In order for the analyst to program the system described herein, first the analyst must create an answer template file (an ASCII file). FIG. 14A and FIG. 14B show an example of an answer template file. In a preferred embodiment of the invention, the answer template contains two sections: the first section (example in FIG. 14A) contains a call to a program. The second section (example in FIG. 14B) contains a template of the answers to be filled with values from a user application. We will explain the contents of this file further below in the detail description of this invention. All the requirements that the analyst determines to allow for fuzziness are included in this file. Then, the analyst must define the requests that require exact processing in another file. FIG. 9 shows an example of a file with exact requests. In the file of FIG. 9, the analyst defines the transfer of funds request (900) and the request for checks that cleared (908). Along with the file in the example of FIG. 9, the analyst must construct a simple grammar user. FIG. 8A and FIG. 8B shows examples of grammars user. We will explain the contents of these files in more detailed descriptions below. These files are stored on disk and ready for the system to load.

Description of the Main Process and Interaction Between the Different Parts of the System FIG. 1A depicts a very high-level block diagram of an information system that utilizes this system herein. The system described herein is typically implemented in a client-server configuration, where the bulk of the process runs as a server program (1) in a server computer system (2) and the user interface runs as a client (4) and possibly, but not necessarily, in a different computer than that of the server. In either case, the client accepts as input a multiplicity of natural language ASCII strings, and sends them to the Server program (1). The client software can be utilized within a number of technologies and computers, including web server (7), chat systems (6), speech systems (5), or just in a terminal session (9). The client software (4) communicates through a network such as the Internet (3) with the server (1) through a network protocol such as TCP and sockets and HTTP. Through this medium (the network), the client software passes the multiplicity of natural language strings to the server as well as it retrieves an answer object from the server program (1) with different kinds of information. When the client software is utilized within a web server (7), an indefinite number of people can interact with the system, typing requests with the keyboard into a web page via a web browser, and send those requests to the web server by virtue of the World Wide Web.

In a typical chat system (6) there are multiple instant messaging applications (commonly known as "instant messengers") installed in different computers and a main server that re-directs messages between senders and recipients. Chat systems can be utilized for customer support where both customers and customer representatives are equipped with an instant messenger. Because of the conversational capabilities of the system (1), in the preferred embodiment of this invention, a chat system (6) is used to re-direct overflow messages (i.e., there are more customers than the number of customer support representatives) to the server system (1). In a different embodiment of the invention, the instant messenger installed at the customer's computer invokes the client software and connects directly to the server program (1).

As depicted in FIG. 1A, the system herein can be used with a speech application, which is typically equipped with a speech recognition engine (10), which converts speaker utterances into text, and a text-to-speech interface (8), which synthesizes text into speech. A typical speech application is interfaced through a handheld device, such as a telephone or a microphone (11). A typical speech application can serve a multiplicity of speakers at the same time. Also, a typical speech recognition engine can produce a multiplicity of texts from the same utterance, because multiple orthographic transcriptions may sound like the given utterance. As already mentioned, the client software can take as input a multiplicity of text requests. The system herein implicitly improves speech recognition, that is, it selects the correct text from the multiplicity produced by the recognizer (10). This is explained below in further detail.

The server software (1) also interacts with backend applications (14) that interact with proprietary database systems (15). The server software (1) translates the user's request into a query or a transaction, whose processed information ultimately resides in such databases (5).

The server (2) is a computer equipped with a storage media and a processor, such that the storage media contains the server software (1) and the server software dynamically configures the processor, so that such processor can perform all the functions described herein.

Figure 1B:
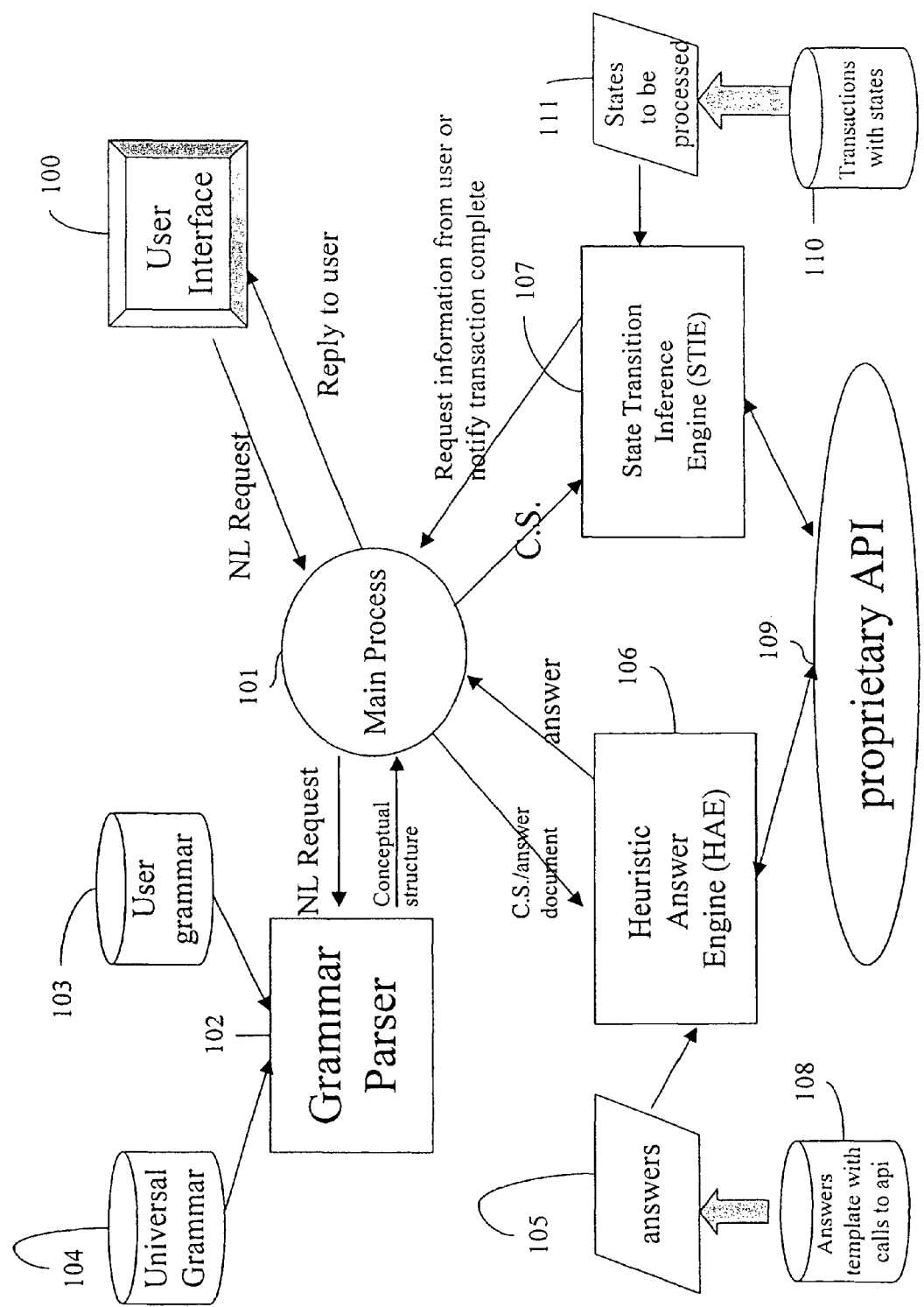
FIG. 1B: A very high-level block diagram showing the different parts and subsystems that make up the invention.

A closer look at the server software is depicted in FIG. 1B. However, FIG. 1B is still a simplified block diagram of the server software, hereafter referred as "the system". FIG. 1B shows the system of the invention described here, comprising a heuristic answer engine (106), a state transition inference engine (107), a grammar parser with semantic augmentation (102) and other parts that are described below. All instances of the client software (4) shown in FIG. 1A are summarized in FIG. 1B with the user interface (100).

First a user through the client interface (100) is asked by the system to identify himself. This can be achieved by asking the user to provide some personal information (like name and social security number) or an account number. The main process broker, namely main process, (101) stores this information in memory to be utilized later. Then, the main process asks the user to make a request. When the user makes the request in natural language, the client interface reads in this request as a string. The main process (101) takes the natural language string from the user interface (100). Then the main process (101) sends the natural language string to the grammar parser (102). The grammar parser tries to parse the natural language string first with the user grammar (103). Examples of user grammars are depicted in FIGS. 9 and 10. As described previously, the user grammars are grammars that are defined by an analyst or software developer and they are used to parse statements that require exact process, such as transactions or exact replies. If the parsing with the user grammar is successful, the grammar parser (102) notifies the main process (101), that an exact query-transaction is to be processed. At the same time the grammar parser builds a conceptual structure and a tree of objects, where each object contains semantic information about the natural language request. Hereafter, such a tree of objects is referred as conceptual tree. If, on the other hand, the parsing with the user grammar is not successful, the grammar parser (102), attempts to parse the natural language string with the universal grammar stored in disk (104). A universal grammar is one that is generic for any request involving a query. Example of queries are: "What are my last five transactions?", "I'd like to know the balance in my checking account". If the grammar parser (102) successfully parsers the user's request with the universal grammar (104), the grammar parser notifies the main process that the user's request can be treated as a fuzzy query. On the other hand, if the grammar parser is not capable to parse the natural language string with neither grammar (103,104), then the grammar parser (102) notifies the main process that the request is not understood.

In such a parser, a simple priority algorithm is used, where the user grammar takes priority over the universal grammar. In a different embodiment, in order to enhance the conversational capabilities of the system, additional grammars with less priority can be added to the priority list. Such grammars have less priority because they do not cause any interaction between the system and the third party application programs. For example, we could add another grammar that handles sentences that allow the user to maintain a friendlier conversation, such as:
"Let me think about this"
"Just a minute"
"Let me look into my wallet for the credit card"
"Are you still there?"

A forth grammar could then be added for handling superfluous sentences such as:
"Oh well"
"I'll be darn"
"Oh my gosh"
"What the heck"

In this example, the priorities take the form:
IF PARSING USER GRAMMAR SUCCESSFULL
THEN
USER_GRAMMAR=TRUE
ELSE
IF PARSING UNIVERSAL GRAMMAR SUCCESSFULL
THEN
UNIVERSAL_GRAMMAR=TRUE
ELSE
IF PARSING FRIENDLY GRAMMAR SUCCESSFULL
THEN
FRIENDLY_GRAMMAR=TRUE
ELSE
IF PARSING SUPERFLOUS GRAMMAR SUCCESSFULL
THEN
SUPERFLOUS GRAMMAR=TRUE
ELSE
REQUEST_NOT_UNDERSTOOD=TRUE If the grammar parser parses the natural language string with any of the grammars successfully, the grammar parser then also constructs a conceptual tree as in the example of FIG. 4. Conceptual trees (and conceptual structures) are explained in full detailed below.

If the request is determined to be a fuzzy query, the main process sends the conceptual tree to the heuristic answer engine (106) along with the user's personal information or account number. The heuristic answer engine (106) loads the answer template (108) as the example depicted in FIGS. 14A and 14B. The answer engine parses the answer template. In a preferred embodiment of this invention, the answer template is expressed in a tagged document format such as standard XML (Extended Markup Language) as shown in FIGS. 14a and 14b. For this purpose, a number of XML parsers exist that load the tags and values of the XML file into memory. XML is well known and the corresponding XML parsers are also well known. Therefore, there is no need to explain how to parse this answer template. The answer template contains calls to a proprietary application (1401). When the proprietary application is called, the answer engine uses the return values (1403, 1404, 1405, 1406 . . . ) from the application as expressed in the template file and the paragraphs in the answer template (1422) to construct a document of answers as depicted in FIG. 15. The new document of answers is specific for the user that is connected to the main process (101). As it will be explained below in full detail, the heuristic answer engine (106) searches the document of FIG. 15 for the best answer. The answer is therefore retrieved and sent back to the main process. The main process then sends the answer back to the user interface (100). At this point the user may not be satisfied with the answer, in which case he can re-phrase the request, or he can make a totally different request.

If the request is determined to be an exact query or transaction, the main process sends the conceptual tree to the State Transition Inference Engine (107). The State Transition Inference Engine then loads the transactions file (110) (as in the example of FIG. 13). The State Transition Inference Engine builds a logical table of requests and a logical table of states from the transaction file. The State Transition Inference Engine walks through the conceptual tree at the same time that tries to match the user request with the request in the table of requests and the table of states. This process will be explained below in detail in the corresponding subsystem's description. When the transaction has been identified, if any of the states in the transaction file has not been matched, the state is activated and the corresponding information about that state is sent back to the main process (101). It should be noted that only the states that are not matched are the states being activated. The state also contains a prompt, which is used to request information from the user. This prompt is sent back to the user interface. However, if the user request contained in the conceptual tree is matched entirely with all the states corresponding to such request, the state transition inference engine can execute the transaction using the proprietary API (109). This part of the system will be explained in full detailed below in the corresponding embodiments of the invention.

The functionality of the main process is further explained with the following pseudo code:

```
Get user's identification from the Client.
Store identification in memory.
Get natural language request from the Client.
Send request to the Grammar Parser.
Grammar Parser returns conceptual tree and indicates which
grammar was used successfully in for parsing
Depending on which grammar was successful, the main process
determines whether request is fuzzy or exact.
If request is fuzzy then
    Send conceptual tree to the Heuristic Answer Engine
    Send user identification to the Heuristic Answer Engine
    Get Answer Object from Heuristic Answer Engine
End if
Else
If request is exact then
    Send conceptual tree to the State Transition Inference Engine
    Send user identification to the Heuristic Answer Engine
    Get Answer Object from State Transition Inference Engine
    Get Transaction Object from State Transition Inference Engine
    and keep it in memory
        Where said Transaction has all the activated states that are
        expected
        To be fulfilled with information from the user at any time during
        conversation
End if
Else
    Request was not understood
Send Answer Object to the Client Interface.
```

It should be observed that one of the reasons why this invention provides natural interaction, is the user's ability to interrupt in the middle of a conversation with another discourse segment ("discourse segments" are known in the art of Computational Linguistics), and to resume the previous discourse segment that had been interrupted. For example, if a user requests, "I'd like to transfer funds from my savings account to my checking account", the system would ask the user for the amount of transfer. However, it is only natural that at this point, the user would want to know the balance in his savings account in order to make sure that there are sufficient funds, instead of answering the question prompted by the system. The user would say something like:

"How much do I have in my savings?"

and the system would reply:

"You currently have 800 dollars."

Now the user can resume back to the pending question and answer,

"I want to transfer $400".

Therefore, the system remembers that it was previously expecting the amount and then completes the transaction. This ability for handling discourse deviations while maintaining control of the discourse is possible due to the separation of the two engines: the state transition inference engine and the answer engine. Although the main process (101) is working with both engines, they are mutually exclusive. In the above example, the state transition inference engine only "knows" about the transaction that it is trying to complete and it is keeping record of such a transaction. However, the State Transition Inference Engine doesn't "know" what the Heuristic Answer Engine is doing in the meantime for the user. While the answer engine tries to retrieve an answer, the state transition inference engine is still waiting for the user's response on the amount to transfer.

In a different embodiment of this invention, in addition to the additional grammars, other engines may be added, capable to handle other communicative acts, such as superfluous phrases and friendly sentences, which would have been previously parsed with the corresponding grammars. In such embodiment, further type of interruptions can exist. These various interruptions can be illustrated in the example below:

USER: I'd like to transfer funds from my savings account to my checking account
SYSTEM: How much would you like to transfer?
USER: How much do I have in my savings? (INTERRUPTION: Causes heuristic search)
SYSTEM: You currently have 800 dollars.
USER: Oh no, I thought I had more money! (INTERRUPTION: causes system to recognize a useless comment handled by a third grammar and a third engine and waits for next user statement)
USER: I want to transfer $400 (System resumes back to original discourse segment).
SYSTEM: You said you want to transfer $400 from your savings account to your checking account. Is this correct?

Detail Description of the Grammar Parser with Augmented Semantic Information

The Grammar Parser with semantic augmentation is a computer program and the methods used in such a program are described below.

The objectives of the grammars (103,104) and the grammar parser (102) are:

1—Verify whether a natural language statement is a valid statement accepted by the grammar.
2—Build a conceptual tree, which is based on the idea of the conceptual structure, but with richer information and functionality.
3—Determine whether a request is to be treated as a fuzzy query or as an exact query/transaction.

Conceptual structures were first proposed and published in as early as in the 1970's by Ray Jackendoff from the Massachusetts Institute of Technology, Jackendoff et al [Jack 1975], and fully developed in 1988, Jackendoff et al

[Jack 1988]. Those skilled at the art of linguistics, and in particular with the structures of semantic representation, should be familiar with such a form of representation.

Figure 2:
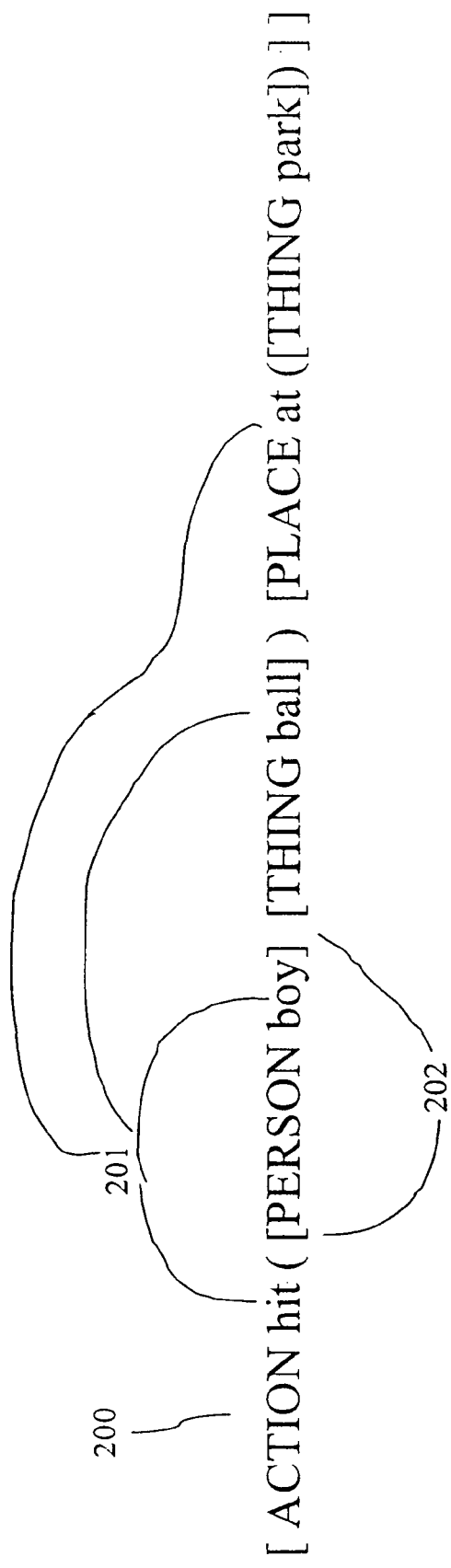
FIG. 2: Example of a conceptual structure.
Figure 3:
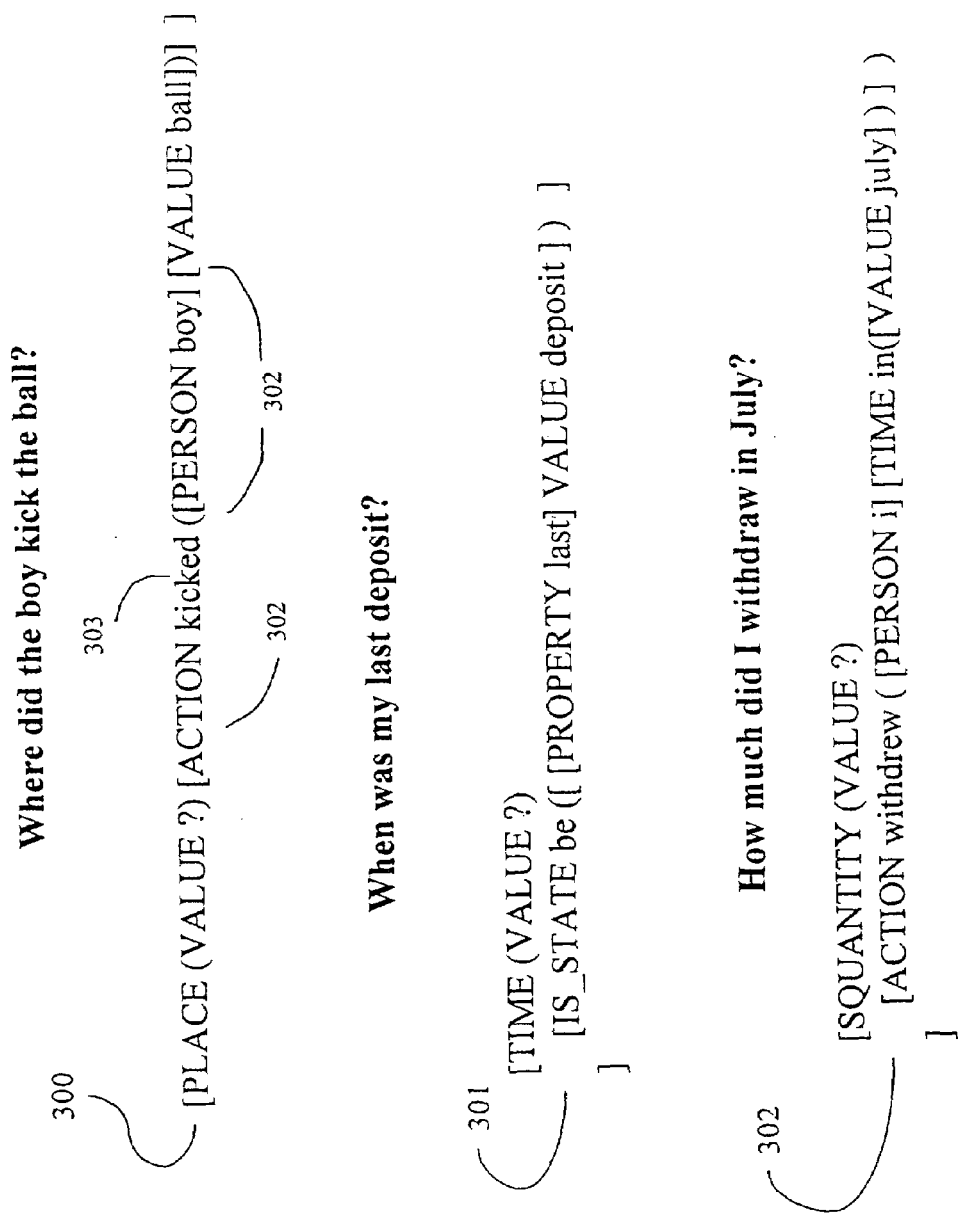
FIG. 3: Sample queries and their corresponding conceptual structures.

The purpose of a conceptual structure is to express the semantics of natural language. FIG. 2 shows an example of a conceptual structure representing the phrase, "The boy hits a ball at the park". A conceptual structure represents the hierarchical structure of concepts within concepts. Each sub-structure of concept is referred to as a conceptual constituent. Each conceptual constituent is enclosed within square brackets ([ ]). Each conceptual constituent has an ontological category (denoted in capital letters) (200), and a functional symbol (a word from the original phrase) (201). A functional symbol has argument each argument being another conceptual constituent (202). The arguments are enclosed in parenthesis. The functional symbol "hit" has two arguments; the functional symbol "at" has one argument; and the functional symbol "boy" has no arguments. Ontological categories are generic categories and are used to categorize all meanings, whether concrete or abstract. Examples of ontological categories are THING, TIME, EVENT, ACTION, PERSON, PLACE and QUANTITY. In a preferred embodiment of this invention, nouns, value amounts, currency amounts, counts or unknown variables are treated as values and we will use the ontological category VALUE. In a preferred embodiment of this invention, the category QUANTITY is split in PQUANTITY (for plural counts as in "twenty people") and SQUANTITY (for mass counts as in "twenty pounds". FIG. 3 shows a conceptual structure for the question for "where did the boy kick the ball?" (300); the conceptual structure for "how much money is in my account?" (301), and the conceptual structure for "how much did I withdraw in July?" (302).

Figure 4:
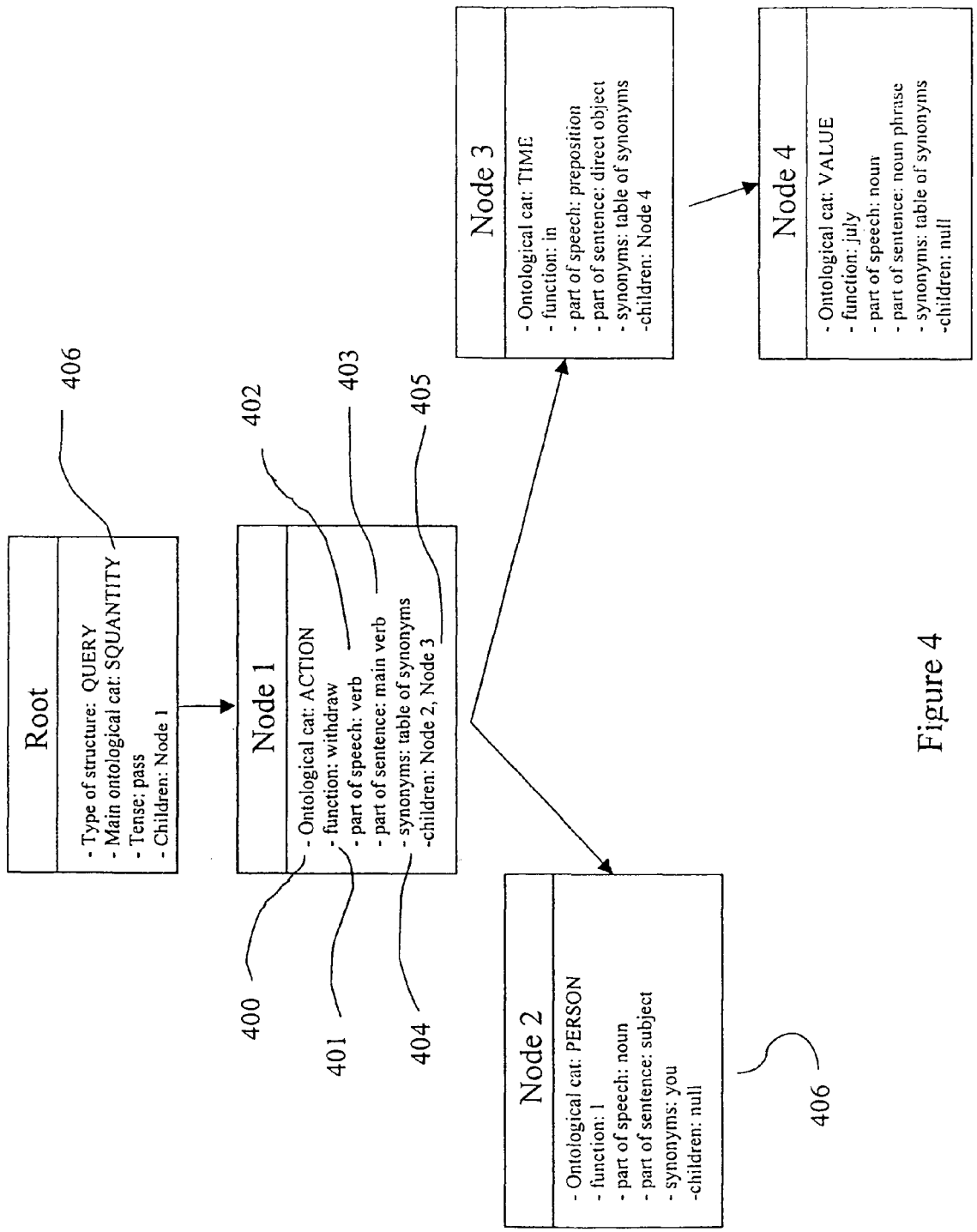
FIG. 4: The conceptual tree corresponding to the last conceptual structure of FIG. 3.

A conceptual structure is hierarchical, and therefore, it can be stored, not just as a string in parenthesis, but also in a tree data structure. At the present, an object oriented programming language like Java can be employed to build a tree of conceptual constituents, hereafter referred as concept objects. It is readily understood that those skilled in the computer arts will be familiar with the notion of objects, and object oriented programming, and with how to construct and traverse a tree structure. Each conceptual constituent in the conceptual structure can be stored as an object with multiple attributes and information. Such a tree is referred in this invention as a conceptual tree. FIG. 4 shows a conceptual tree or the conceptual structure (302) representing "How much did I withdraw in July?". In this invention, a conceptual tree contains more information than a conceptual structure because it includes attributes of each concept object, namely ontological category (401), part of speech (402), part of sentence (403), synonyms of the word (404), and children (405) (links to other concept objects). The concept object also includes a functional symbols (or word) (400), FIG. 5 shows a small section of a context free grammar for the syntax of the English language. The notation of the context free grammar for this example (FIG. 5) is described as follows. Each predicate (505) in the rule is prefixed by a dollar sing ($). The equals sign ("=") means "IS". The predicate at the left side of the equality is typically called the "left side of the rule". What lies on the right side of the equality is typically called the "right side of the rule". The pipe symbol ("|") represents the OR boolean expression, and a space between the predicates is equivalent to the AND boolean or the expression "IS FOLLOWED BY". Following the path of the grammar we can see all the possible expressions that can be accepted by the grammar.

In a preferred embodiment of this invention, context free grammars are augmented with ontological categories, which are placed at the beginning of each grammar rule (500). In the grammar of FIG. 5, ontological categories (500) are enclosed in parenthesis and written in capital letters. The ontological category placed at the beginning of the left side of the rule applies to the entire rule. The ontological category placed at the beginning of a grammar rule, applies to any group of predicates separated by "|", whichever group of predicates can be applied to the sentence. It should be understood that each predicate expands into another rule. The right side of the rule can be a terminal symbol (a word) (504). In a preferred embodiment of this invention the right side of the rule makes reference to a dictionary stored in disk and it is denoted in FIG. 5 with capital letters (502), but in a different embodiment it can also referred to a specific words separated by the pipe symbol. The dictionary referred in the grammar rule contains all the words belonging to a part of speech category. The dictionary is not just a lexicon of words with a syntactic tag, but it also contains semantic information. The semantic information consists of synonyms, ontological categories, and super classes (e.g. bird is a super class of canary). The syntactical information contained in the dictionary is the part of speech (e.g. adjective), and the phrasal category (e.g. subject). Some entries in the dictionary contain multiple words representing one single meaning. Examples of multiple word entries with single meanings are "The White House" and "every Monday". Therefore, hereafter, such a dictionary is referred as semantic dictionary. FIG. 6 shows sample subject phrases that can be parsed by the grammar of FIG. 5.

The main advantage for having a grammar separated from the program is that the same program can be used to parse the user grammar and to parse the universal grammar. Another advantage is that grammars for different languages (e.g. Spanish and French), can be supported without having to change the structure of the program. Yet another advantage is that additional grammars can be added to handle other communicative acts not handled by the other grammars.

Figure 7A:
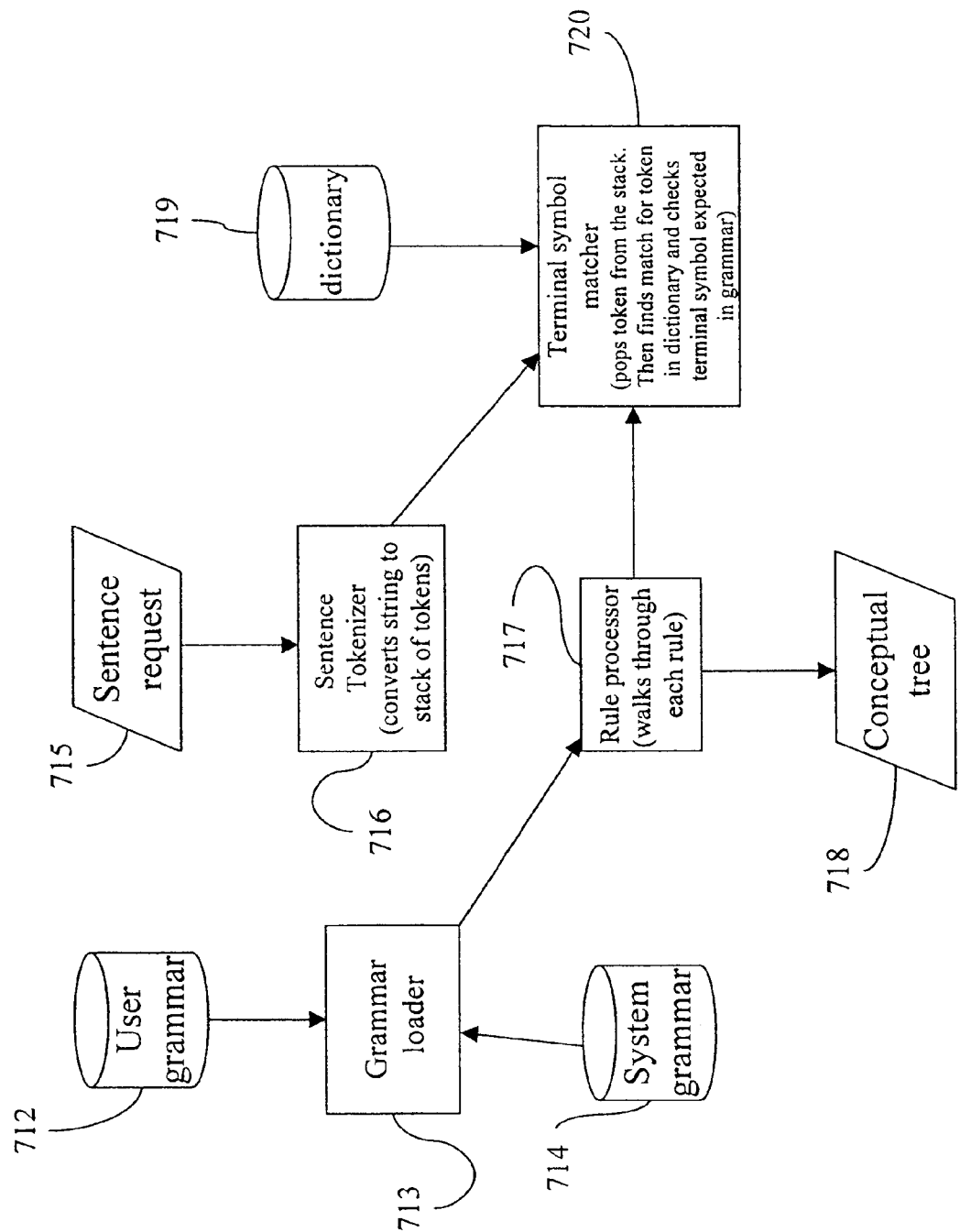
FIG. 7A: High-level flowchart describing the process of the Grammar Parser.

FIG. 7A illustrates the main process flow of the Grammar Parser. First a program (713) loads a grammar (712 or 714) and stores all the rules in to a hash table structure in memory. The keys to the hash table are the left side of the rule and the data to be retrieved from the hash structure is the right side of the rule. This way all rules are linked together within the hash structure because every predicate appearing in the right side is defined at some point and therefore appears also on the left side as its own rule. When the grammar parser receives a natural language string (715) from the main process, the grammar parser converts the string into individual words (716), stripping spaces and punctuation. All such words are kept in order in a stack data structure in memory. A stack data structure is well known. Only the word at the top of the stack is popped out, thereby exposing the next word to be popped out too.

Figure 7B:
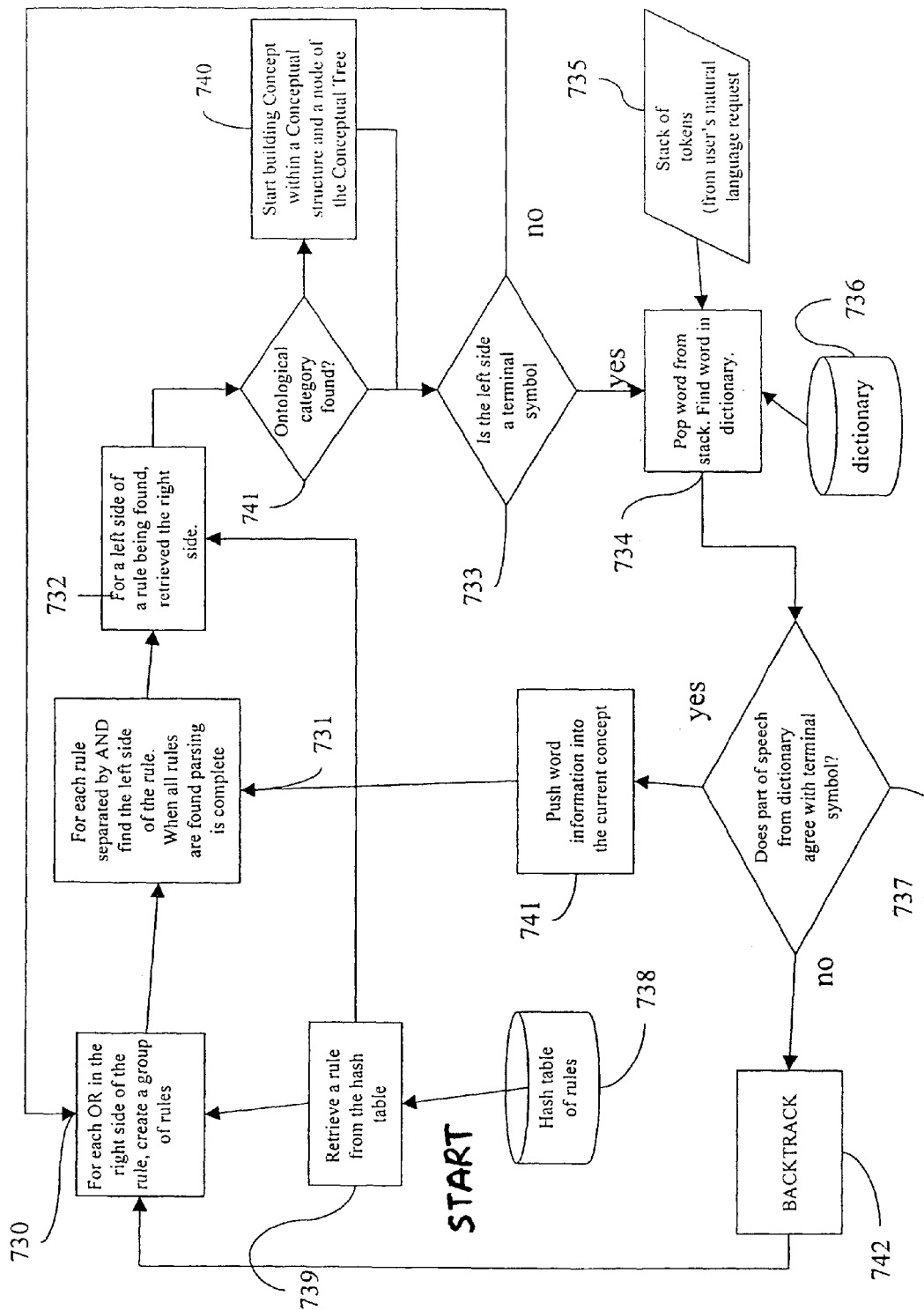
FIG. 7B: More detailed flowchart describing the process of the Grammar Parser.

A rule processor (717) processes each rule from the hash table, and when the rule processor reaches a terminal symbol, the terminal symbol is compared to the word that is popped out of the stack (720). FIG. 7B shows the logic of the rule processor. First a rule is retrieved from the hash table (739). The first rule retrieved is the first rule of the grammar. The name of the first rule is pre-established being always the same. For example, the name of the first rule might be "FirstRule". The rule processor passes the name of this first rule to the hash table in order to get the right side of the rule back. In the right side of the rule, each group of predicates separated by ORs (or "|") is broken into a distinct set of rules (730). Each predicate in such a set is the left side of another rule (713), and therefore the predicate is used as a key to the hash table (738), and once again the right side of the rule (731) is retrieved. In fact, by nature of the ontological categories being placed in front of the rules, the mapping from syntax to semantics is thus specified.

Each time the right side of the rule is retrieved, it is inspected for an ontological category (741). The first ontological category encountered indicates to the parser that a new conceptual structure begins. Subsequent ontological categories indicate to the parser that a new concept is to be constructed within the conceptual structure or within another concept. An analyst, a software developer, or a linguist may be the person in charge of designing and writing the grammar. Such a person is thus responsible for placing the ontological category at the beginning of any rule he may desire. For this reason, such a person is empowered to control how the hierarchies in the conceptual structures should be generated and thereby is also capable in this manner to easily map syntax to semantics.

Each time the right side of the rule is retrieved it is inspected for a terminal symbol (733) or a reference to the semantic dictionary. If the parser has reached a terminal symbol or a reference to the dictionary, the parser pops out a word from the stack (734) and either compares it to the terminal symbol or it looks it up in the dictionary (737). If the comparison turns out to be true, the parser pushes the word and word related information into the current concept object being built in the conceptual structure (743) and then it proceeds to retrieve the next rule. Then the parser retrieves the next rule and repeats the same process that it did on the previous rule until it reaches a terminal symbol or a reference to a dictionary. If instead, the comparison turns out false, the parser puts the word back in the stack and backtracks (742) (backtracking may put other words back in the stack, depending on how far it backtracks). The process of backtracking in parsing is well known. The parser continues to retrieve rules until either all the rules have been exhausted or until all the words in the stack have been popped out successfully.

In a preferred embodiment of this invention, instead of generating a conceptual structure, a conceptual tree is generated directly in the same manner, since it is the conceptual tree that will be used in later processes.

It should be noted that, as the parser keeps going deeper into the rules, not every rule necessarily implies constructing a new concept object in the conceptual tree. Only when the ontological category is encountered, the concept object is built and it is linked directly to the previous concept object.

The first grammar loaded by the parser is the user grammar. FIG. 8A and FIG. 8B show examples of a user grammars. As explained above, this particular grammar would be designed by an analyst to interpret exact query/transactions. If after the grammar parser uses the entire user grammar and fails to pop all the words from the stack, the universal grammar is loaded. The universal grammar is designed to interpret natural language queries in the language specified by the grammar (e.g. English).

Under Jackendoff's theory of semantics [Jack83], every word in a phrase is a functional symbol with zero or many arguments, depending on the word. For example, the verb "put" is a function with three arguments, namely put(X,Y,Z).

Argument "X" refers to the person or animated object performing the action. Argument "Y" is the object being put, and argument "Z" is the place to where "Y" is being put. Furthermore, each argument has an ontological category, which refers to the "type" of argument that is allowed for "X", for "Y" and for "Z". For example, "X" should be a PERSON. "X" should be a THING and "Z" should be a PLACE. Therefore, the function is further expressed as, put ([PERSON X], [THING Y], [PLACE Z])

For example, "Joe puts the book on the table", where "on the table" is the PLACE. "on" is a function with one argument, namely on(X). Under this rule, it is not possible to say "Joe puts the book" (as if it was put(X,Y)) or "Joe puts on the table" (as if it was put(X,Z)). Either phrase is incomplete. Likewise, the word "drink" is a function with two arguments drink(X,Y). For the types of X and Y multiple versions are possible:

Drink([PERSON X], [FLUID Y])

Drink([ANIMAL X], [FLUID Y])

Based on the above definitions of the function "drink", it is possible to say "Joe drinks wine", but it is not possible to say "Joe drinks the telephone" (this doesn't make sense). Therefore, defining each word as a function with arguments, provides information about what sentences make or do not make sense, beyond the syntactical rules provided in the context free grammars.

The semantic dictionary contains, for each word, the type of arguments that it expects and in which order. Such a semantic definition is carried down the parsing of the universal grammar. If the ontological category heading at the beginning of the grammar rule does not agree with the arguments of the function, in type and number, the rule is rejected. Such semantic enforcement ensures that:

1—the phrase makes sense (referring to the meaning of the sentence).

2—the conceptual tree is built properly.

Detail Description of the State Transition Inference Engine Subsystem and Accompanying Method for Supporting Natural Language Conversations If the Grammar parser successfully parses the natural language request with a user grammar, then the main process (101) sends the conceptual structure generated by the grammar parser to the state transition inference engine (107), hereafter abbreviated as STIE. The STIE loads the state transitions. FIG. 9 shows a transaction file with state transitions expressed in XML (Extended Markup Language). A transaction file represents a collection of transactions, each having one or more states (902). A transaction has a name (900) and an ontological category (901). Each state also has a type (903), which can be an ontological category or any type preferred by the analysts creating this file. A state also contains important information. A prompt inside the state is always required. Other information can be included as well. FIG. 13 shows another transaction file with more complex states. In a preferred embodiment of this invention, XML is used to represent the transactions and states that make up the transaction, but other forms of representation, such as a graphical hierarchy, may be used to represent such a hierarchy.

Figure 11:
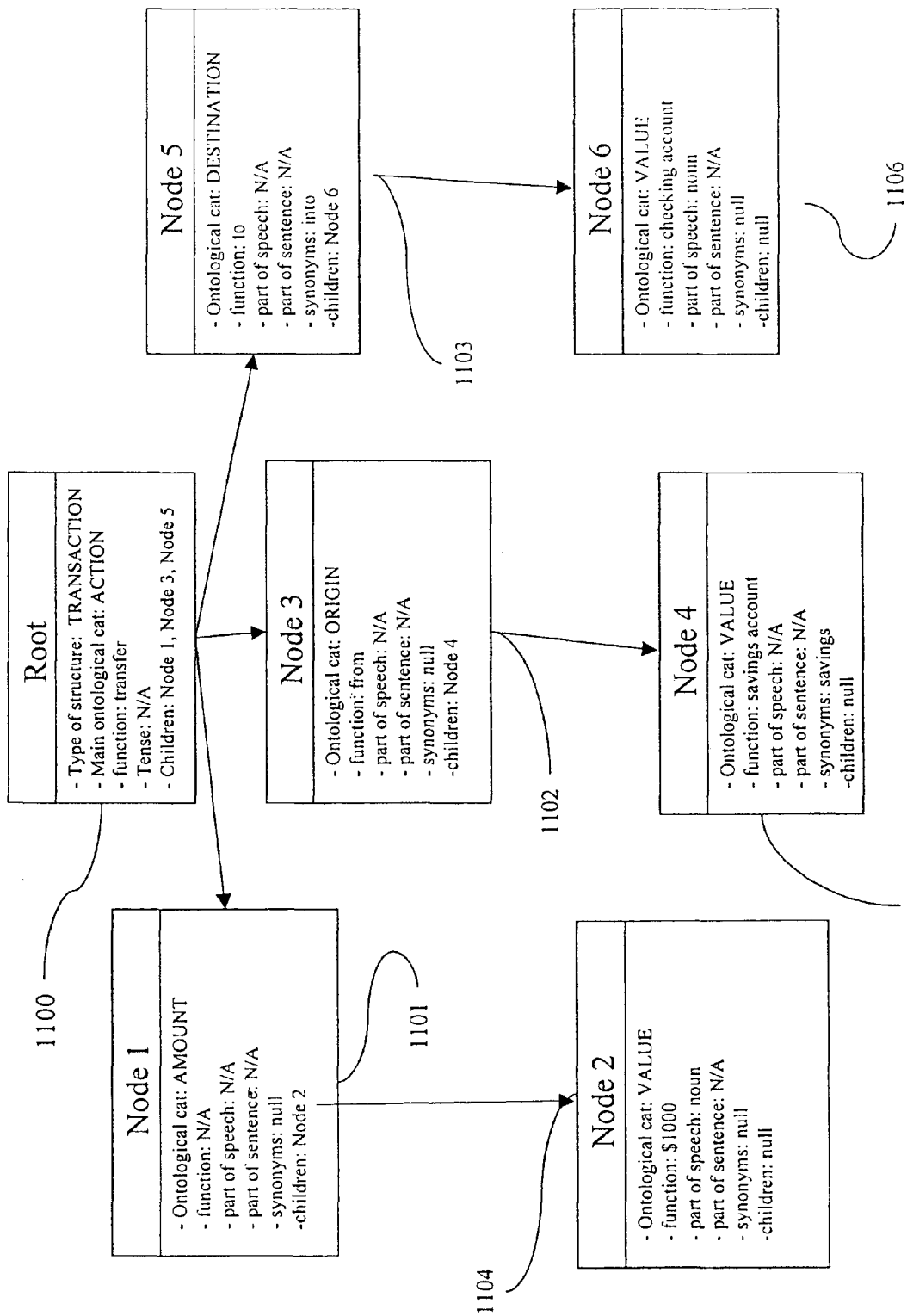
FIG. 11: The corresponding conceptual tree for the conceptual structure shown in FIG. 10.

The "name" attribute of the transaction (900) corresponds to the name found in parenthesis at the beginning of the user grammar (801). The "type" attribute of the transaction corresponds to the first ontological category encountered in the user grammar (801). The "type" attribute inside the STATE tag (903) corresponds to other ontological categories encountered in the user grammar thereafter. All such information also exists in the conceptual tree that has been passed to the STIE, and the same correspondence can be made. FIG. 10 shows the conceptual structure (1000) for the request "transfer $1000 from my savings account to my checking account". FIG. 11 shows the corresponding conceptual tree. In FIG. 11, the root node (1100) corresponds to the transfer request (900). Node 1 (1101) corresponds to state AMOUNT (902). In the same manner Node 3 (1102) and Node 5 (1103) are mapped to the other states ORIGIN and DESTINATION respectively.

In a preferred embodiment of this invention, FIG. 9 also shows how a request can reference a class (905) in Java or C#. Java and C# are well known programming languages. The class may be part of the proprietary API or an extra layer created to interface between this system and the proprietary API, when such a proprietary API is not written in the Java (or C#) language. Within the tag that references the class (905), a reference to each method in the class is made (906). Within the tag that references a method (906), a reference to each parameter passed to the method is made (907).

The system also allows for returning results from the program (909). FIG. 9 shows that a user not only can make a request that translates into a transaction, but he can also ask a question that requires an exact answer. For example, the transaction (908) allows the user to ask, "I'd like to know if check number 123 has cleared". FIG. 8B shows the corresponding grammar that recognizes such a user request. The check number is passed to the proprietary application and the date and amount of the check is returned (909)

The purpose for a state is to retrieve information from the user. A state is activated when information referenced by the "type" attribute in the STATE is missing in the user's statement. For example in a transfer of funds request, three pieces of information are necessary to complete a transaction: AMOUNT, ORIGIN and DESTINATION. In the user's request, "transfer $1000 from savings to checking", the AMOUNT is $1000, the ORIGIN is "savings" and the DESTINATION is "checking". All the information necessary to execute the transaction has been provided and therefore, no state would be activated. But if instead, the request is "transfer funds to my savings account", the states AMOUNT and ORIGIN would be activated because the only thing specified is the DESTINATION.

When the STIE loads the transaction file, using an XML parser, the STIE creates a list of transaction objects in memory. Each transaction object has a list of states. The STIE iterates through the available transactions in the transaction list, in order to see which one matches the root (1100) of the conceptual tree. If a match is found, then the STIE begins to iterate through the states of the transaction. For each state in the transaction, the conceptual tree is traversed until the type of the state (903) matches the ontological type of a node in the tree (1101) (traversing a tree is well known). If there is a match, the STIE proceeds to the next node to find out the value (always a leaf node) (1104). The value is retrieved and put into the state. If there is no match, the state remains without a value and it is flagged for activation. After the STIE iterates through all the states, it proceeds to activate the first state encountered for activation. When the state is activated, any class that has to be executed is executed and the returned values are appended to the prompt (904). The prompt (904) is sent with a reply object to the main process (101). The main process sends the reply object to the client interface and the user then receives a reply. For example, if the user had said, "Transfer funds to my checking account"

the user would get the reply,

"How much would you like to transfer?"

Figure 12A:
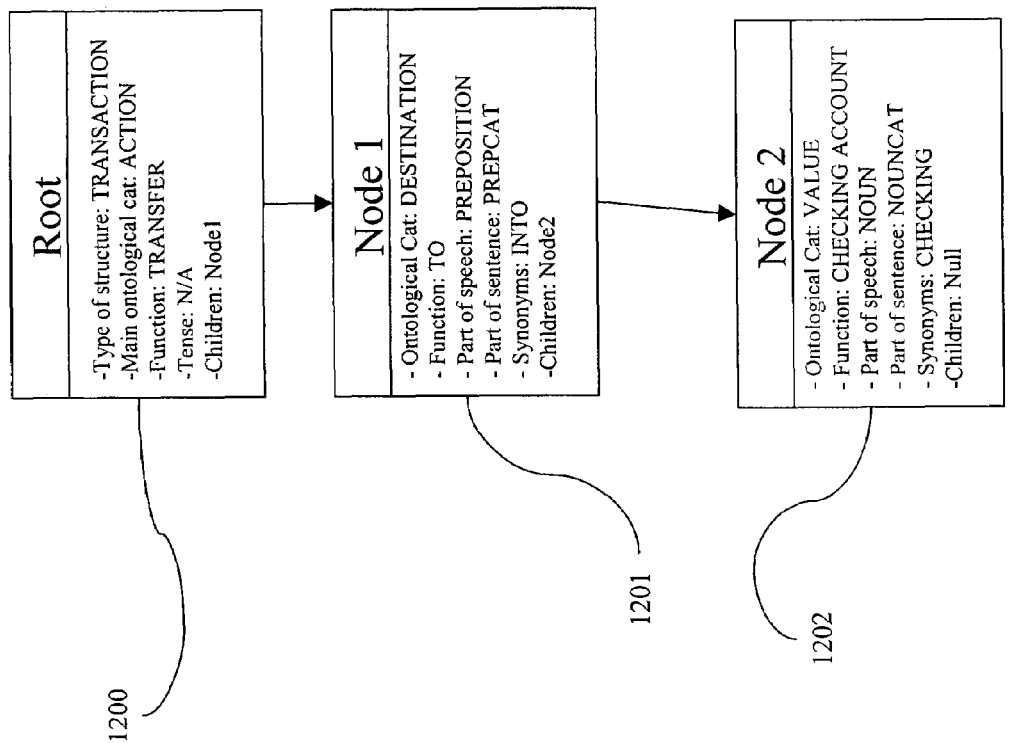
FIG. 12A: conceptual tree for the phrase: "transfer to checking"

FIG. 12A shows a conceptual tree for the request "transfer funds to my checking account." As described above the STIE would only encounter values for the DESTINATION state (909) (namely "to my checking account") and no values for the states AMOUNT and ORIGIN. The first state found in the list of states with no values is AMOUNT (903); therefore, the state AMOUNT is activated and the user gets the prompt "how much would you like to transfer?"

The user may then say,

"transfer $1000"

Figure 12B:
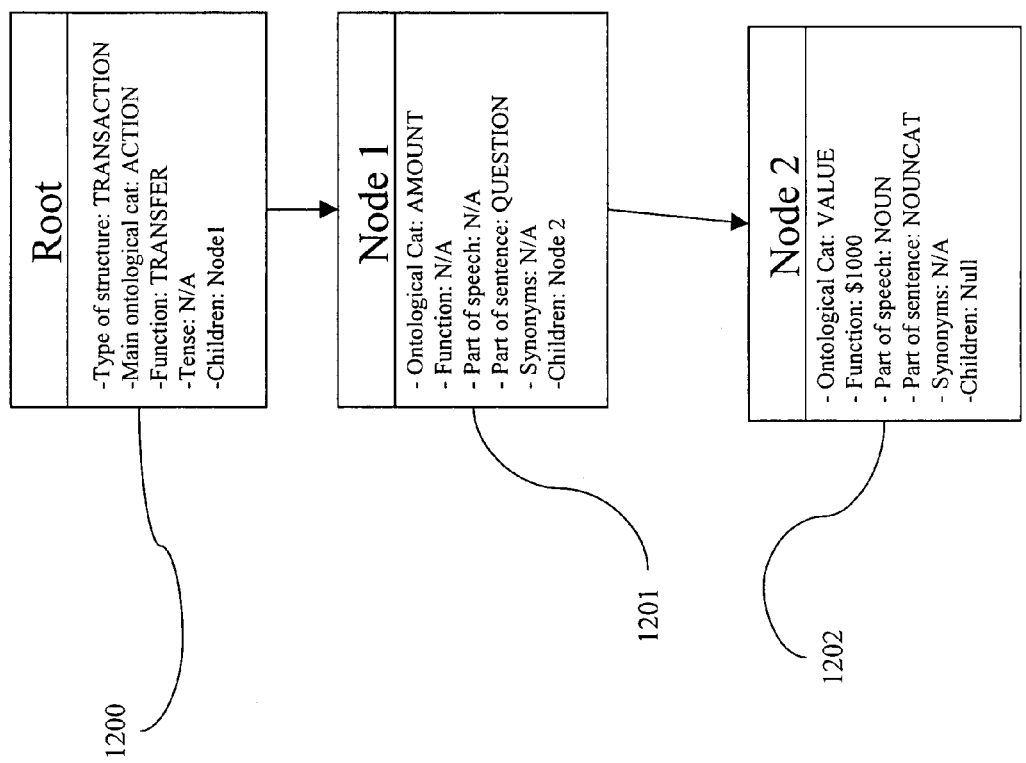
FIG. 12B: conceptual tree for the phrase: "transfer $1000"

FIG. 12B shows the corresponding conceptual tree generated. This time the STIE would not load the XML transaction file, since it already has one transaction loaded in memory. The STIE iterates through the states already in memory, at the same time that it traverses the conceptual tree from the root (1210). The STIE merely tries to fill in the gaps where there is one. In this case, it maps the value "$1000" to the AMOUNT State. The STIE thus tries to find a match between the conceptual tree and the information that is missing in the states. For example, if current transaction is missing values for AMOUNT and ORIGIN, the STIE will seek for the nodes in the tree with ontological types AMOUNT and ORIGIN. In this example the AMOUNT (1211) would be found in the same manner as described above. The transaction would still have the state ORIGIN unfulfilled, and therefore the state ORIGIN would be activated. The user would then get a prompt, "From what type of account would you like to make this transfer?"

The user might say

"From my savings account"

In the same manner as described above the STIE would be able to fulfill the ORIGIN State. At this point, the STIE finds that all the states are fulfilled and the transaction is flagged for execution. Normally, a confirmation prompt would be sent to the user to verify all the pieces of information. In the user positively confirms, all the values that are found in the states are then transferred to the ontological categories that are used as parameters (907) to the methods (906) in the class (905). The class is then instantiated, the methods are called with the corresponding parameters, and the transaction is therefore executed.

It should be noted that after the user was asked, "how much would you like to transfer", the user could have replied, "transfer $1000 from my savings account", thereby providing the AMOUNT and the DESTINATION. The STIE would have made the appropriate comparisons and would have fulfilled all the states. No more states would have been activated and the transaction would have been executed. Likewise, if the first request of the user had been "transfer $1000 from my savings to my checking", the STIE would have fulfilled all the states right from the start, in which case, no state would have been activated and the transaction would have been executed.

The following is a pseudo code of the algorithm that accomplishes the tasks described above:

```
If a list of transaction with a list of states doesn't already exist in memory
    Load XML file
    For every transaction do
        For every state in the transaction do
            Add state to state list of that transaction.
        End For
        Add transaction to the transaction list
    End For
End If
For every transaction in the transaction list do
    If transaction name =
    Ontological Category of ConceputalTree.Root then
        For every state in state list of transaction do
            If state value is not present then
                While there are more nodes in the conceptual tree do
                    Get Next node
                    If state type = ontological category in node then
                        Get descendent node with VALUE category
                        Put value in the state
                    End If
                End While
            End if
        End For
        For every state in the list do
            If state DOES NOT have a value
                Activate state
                Transaction ready = false
            End If
            If transaction ready
                Send confirmation to user
                If user positively confirms
                    Execute transaction or run query
                    and return results
                Else
                    Cancel transaction
                End if
            End If
            Else
                Request more information from user using
                the activated state
            End Else
        End For
    End If
End For
```

In the above examples, as well as in the above pseudo code, any non-fulfilled state may be activated. However, there are applications in which the activation of a state should depend on the fulfillment of another state or states. For example, in a hotel reservation system, a may be prompted with the question, "In what area of town would you like to stay?"

if the user has not specified the town of the intended travel.

In a preferred embodiment of this invention, a state may depend on another state and such dependencies are specified on each state, where a dependency refers to another state. One state may depend on one or more states. FIG. 13 is an example of a transaction file showing such dependencies. The transaction file in FIG. 13 is intended for a user to be able to make hotel reservations. A corresponding grammar would recognize requests such as:

Reserve a room in Phoenix.
Reserve a room in Phoenix for Jul. 14, 2002.
Reserve a room on Jul. 14, 2002.
Reserve a room in Phoenix near the airport on Jul. 14, 2002.
Reserve a room in Phoenix at the Marriott near the airport for July 14, If the user's request is "Reserve a room on Jul. 14$_{th}$, 2002", based on the dependency (1306) in the state HOTEL (1305), the state hotel could not be activated because the state HOTEL (1305) depends on the state LOCATION (1303). For the same reason, the state LOCATION (1303) would not be activated either because of its dependency (1304) on the CITY State (1301). Therefore, the CITY State would be the only state activated and the system would prompt to the user, "To what city would you like to travel".

If the user provides just the city of travel, the STIE would then activate the state LOCATION and ask the user, "what area of town would you like to stay?" But if the user response was "In Phoenix near the Airport", then the STIE would activate the HOTEL State and ask the user to specify the hotel of choice because both CITY and LOCATION are specified. This embodiment is accommodated in the above algorithm as follows,

```
For every state in the list do
    If state DOES NOT have a value
    AND state DOES NOT have a dependency then
        Activate state
        Transaction ready = false
    End If
    Else
    If state has a dependency then
        Find the state dependent on
        If state dependent on has a value then
            Activate state
            Transaction ready = false
        If transaction ready
            Send confirmation to user
            If user positively confirms then
                Execute transaction or run query and return results
            Else
                Cancel transaction
            End if
        End If
        Else
            Request more information from user through the activated state
        End Else
End For
```

In a preferred embodiment of this invention a proprietary application can also be invoked from within state. FIG. 13 shows how a state can execute a program that will return all the hotel choices (1309) at particular area of town for a particular city.

For further clarification, it should be noted that each transaction is implemented as a rule base system where each state is a rule, the left side of the rule is the state type, and the right side of the rule is all the information contained within the state. Therefore, the system herein, is a system of rule base systems, since it handles a plurality of transactions. There are however, some important differences with this rule base system and a traditional rule base system. The subsystem described here in works opposite to a traditional rule base system, by the fact that the rules that fire are the rules that are not matched, while in a traditional rule base system the rules that match are the rules that fire. In addition, in a traditional rule based system, the process of rule-matching takes place through an inference engine with context resolution that employs traditional search method specially designed for rule base systems. However, in this invention, the inference engine is ever changing, depending on the semantic structure derived from the natural language phrase. Therefore, we have avoided using the term "rule" in this context, such that is not confused with the rules of a traditional rule base system and that it is not confused with the syntactical rules of the above mention grammars. In every sense, a context free grammar is traditionally implemented as a traditional rule base system.

It should also be noted that a transaction may correspond to a discourse segment and therefore a discourse segment can be managed in the manner as we manage a transaction. Since not every discourse segment may necessarily be transaction, we may refer to such transactions as "transaction discourse segments". As we saw in the description of the Main Process Broker, other expressions can exist within a discourse segment that is not part of the transaction states. Such expressions, as we pointed out before, are interruptions in the discourse. In addition, it should be apparent from the algorithm described for the STIE that, not only a transaction discourse segment can be interrupted by a variety of expressions, but it can be also interrupted by another "transaction discourse segment". However, when this happens, the previous "transaction discourse" disappears; in a sense, it's canceled. For example:

USER: I'd like to transfer funds to my checking account.
SYSTEM: How much would you like to transfer?
USER: (For get it). I'd to apply for a car loan.
SYSTEM: What is the amount of the loan? (The previous transaction was canceled).

As a concluding remark and in order to further illustrate the capabilities of this subsystem, a user is allowed to express in natural language whatever he wants to say in order for the a transaction to be completed. In a typical conversation between a user and a human agent, the agent may just ask, "how may I help you?" The user then might say everything he wants to do, for example "I'd like to transfer $1000 from to my checking account from my savings". Or the user may provide a piece of the information and let the agent ask for more. Examples are:

Transfer $1000 to my checking.
I'd like to transfer funds.
Transfer funds from my savings account.
Transfer funds from my savings account to my checking account.

In the same manner, the system here in, can accept the above requests and asks the user for more information to complete the transaction. As it has been explained above, the combination of the simple transaction file of FIG. 9, and a conceptual tree (generated by the Grammar Parser with the grammar of FIG. 8A) would allow the STIE to make the right decision about what to reply to the user for any of the above requests, before calling the proprietary API for completing a transaction. This in part, allows for a natural conversation between the user and the system described in this invention without the complex dialog logic flow that would have been required with prior art.

Detail Description of the Heuristic Answer Engine Subsystem with Accompanying Method and Algorithms for Retrieving Answers from Proprietary Applications If the Grammar parser fails to parse the natural language requests with the user grammar, but it successfully parses it with the universal grammar, then the main process (101) sends the conceptual structure generated by the grammar parser to the heuristic answer engine (106), hereafter abbreviated as HAE. The HAE loads the answer template (108). The purpose of the answer template is to gather all the possible answers that can be delivered to a user.

FIGS. 14A and 14B show an answer template expressed in XML. An answer template consists of two parts. The first part (as shown in FIG. 14A) contains a call to a proprietary API, via a Java class or a C# class. First the class is instantiated (1400) and its associated methods are called. Each method (1402) returns a value and that value is stored into a result variable (1403). The second part of the answer template (as shown in FIG. 14B) contains a collection of paragraphs, each being a potential answer. Each paragraph has variables that are specific for a user session. Each variable corresponds to a variable appearing in the first part of the answer file. The variables customize the answers for a specific user. When a user provides login information, such as an account, a method queries the third party database (1401) and retrieves the user related information into the class. Then all the other methods are called and each call populates the corresponding variable. The HAE takes the populated variables and match them up with the variables appearing in the template of answers, in order to produce a text with complete answers that are customized for the user. FIG. 15 shows an example of a text of customized answers. For example, in a banking application, one of the answers that may be delivered to the user is the balance in the savings account. As shown in FIG. 14A, a returned value from a method (1402) would be stored in an SAVEBALANCE variable (1403). When the HAE combines the populated variables with the paragraphs in FIG. 14B the value of the SAVEBALANCE variable in the paragraph (1415) would be replace by its value (1500), thereby yielding the answers in FIG. 15.

The generated text, which has been customized for a user, is kept in memory. When the user asks a question, the HEA attempts to retrieve from the text the best answer that qualifies the user's question. This process is explained below in full detail.

The main objective of the HEA is to find a resemblance of the conceptual tree in the customized text. The resemblance to the conceptual tree is based on three major heuristic rules:

1—There must exist same or similar concepts (meanings) in the conceptual tree as in the customized text.

2—The distances between such meanings must be below a threshold value. Such a distance represents the relation between two nodes in the conceptual tree. The threshold represents the maximum distance that two meanings can have in order for them to be related in the conceptual tree. For example a user may request "when does the supersonic jet fly?", while the customized text contains, "the jet flies every Monday at supersonic speeds". A conceptual tree would dictate that the word "supersonic" and "jet" in the sentence are directly related by one link and therefore, it expects to find the same type of relation in the customized text. The threshold that establishes a relation in the text might be 7 words. Therefore, since the difference between "jet" and "supersonic" is 5 words (below the threshold), a relationship is found. There is also a direct relation in the tree between "jet" and "when". The meaning of "when" is found in the customized text, which is given by "every Monday". Such relation exists because "when" and "every Monday" have similar meanings since they both have the same ontological category, that is "time".

3—The more nodes in the conceptual tree that are matched in the customized text, the better the request can be fulfilled by a certain portion of the text.

4—The threshold is provided by the conceptual tree, such that each threshold is unique to each conceptual tree.

The customized text is first prepared with semantic information. The semantic information consists of synonyms, ontological categories, and super classes. In a preferred embodiment of this invention, the HEA contains a database of meanings (or semantic dictionary), previously loaded in memory. The dictionary contains words, their ontological categories, their super classes (e.g. bird is a super class of canary), synonyms, the part of speech (e.g. adjective), and the phrasal category (e.g. subject). Some entries in the dictionary contain multiple words representing one single meaning. Examples of multiple word entries with single meanings are "The White House" and "every Monday". For this purpose, the same dictionary that is used by the Grammar Parser can be employed.

The HEA first finds the root of the conceptual tree (as in FIG. 4) and inspects the main ontological category of the phrase (406). The HEA scans the entire text file and looks up each word in the semantic dictionary. For every successful lookup, the information found in the semantic dictionary is stored in a semantic object, which in term is stored into a vector of objects (from hereafter we will refer it as a semantic vector). Each semantic object has most of the attributes found in the semantic dictionary, such as ontological category, super class, synonyms, part of speech and phrasal category. In addition, the word object contains a position attribute indicating the offset position of the word in the text.

Figure 16:
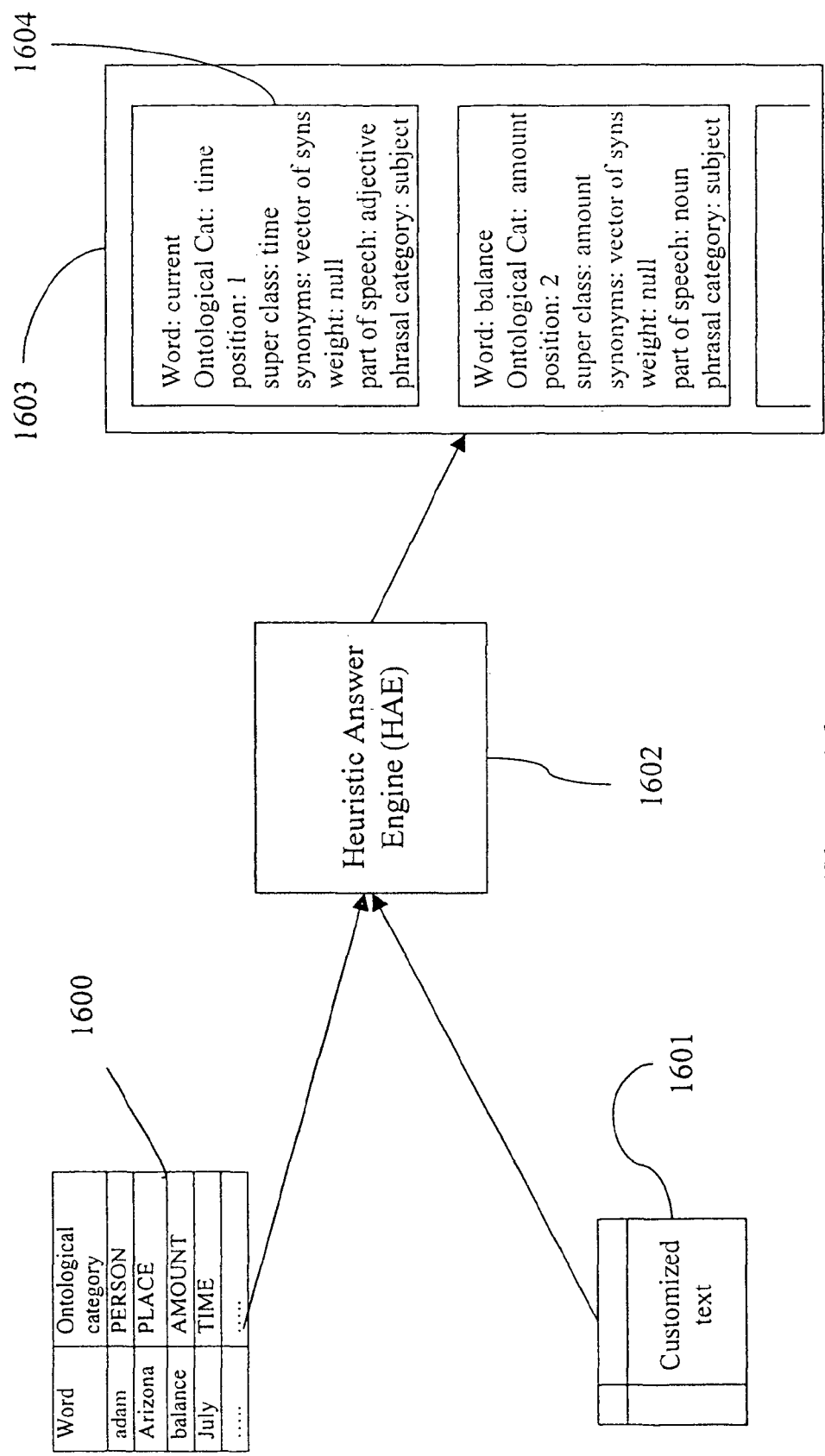
FIG. 16: How the Heuristic Answer Engine combines the answer template and a semantic dictionary to produced a vector of semantic objects representative of the customized text.

FIG. 16 shows how the HEA processes the words of in the customized text. For each word encountered in the customized text (1601), a new semantic object (1604) is added to the semantic vector (1603).

Figure 17:
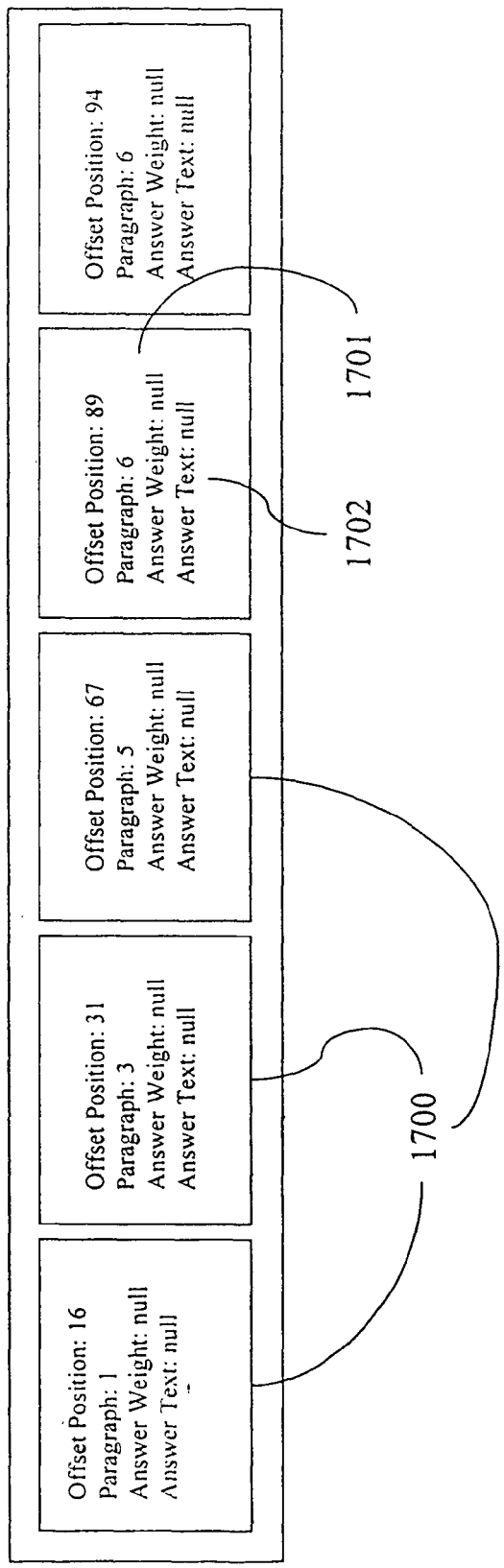
FIG. 17: Answer Vector generated from the customized text in FIG. 15, when the Main Reference Point is the word "you".

Once the HEA has the semantic vector in memory (1603) and the conceptual tree (as in FIG. 4), the HEA is ready to search for answers. The HEA begins to traverse the conceptual tree. The HEA first searches in the conceptual tree for the main reference point of the search. Such reference point can be a SUBJECT (Subject is a known term in the art of linguistics), a DIRECT OBJECT (Direct object is a know term in the art of linguistics) or the MAIN VERB. Therefore, first the HEA searches for a node whose part of sentence (403) is SUBJECT. If it cannot find a subject then the HEA will look for a node with a part of sentence equal to DIRECT OBJECT. If it cannot find a direct object, then the HEA looks for a node with a part of sentence equal to MAIN VERB. The main verb refers to the main verb in the verb phrase of a sentence. For example, in FIG. 4 the main reference point is node number 406. When the main reference point is found in the tree, the HEA proceeds to find a match in the vector of word objects. If a match is found, the offset position of the word in the vector is kept in memory. In a preferred embodiment of this invention, there can be multiple matches, each match referring to a candidate answer. We also create a vector of candidate answers (answer vector), where each candidate answer is an object containing attributes and information about the candidate answer, and hereafter referred as answer object. The attributes of an answer object are the offset position of the main reference point, a weight and the actual sentence or paragraph of the answer. At this point, the only attribute containing any information is the offset position of the main reference point. FIG. 17 shows an example of an answer vector with answer objects (1700).

The next step of the HEA is to calculate a tree weight from the conceptual tree. The conceptual tree is then traversed completely starting from the root and reaching every node, for the purpose of calculating a number of nodes in the tree. The tree weight is then calculated by multiplying the number of nodes times the pre-established threshold. For example, if the threshold is established to the value of 10, the tree weight of the conceptual tree in FIG. 4 is:

4 nodes×10=40.

The HEA goes back to the root node and inspects the main ontological category of the sentence. HEA then inspects and counts every semantic object in the vector, starting from the main reference point, until it finds the main ontological category or until the threshold is reached. The search moves backwards and forward. If a match is found (and the closest match is only taken into account), the count is added to the weight of the answer object. For example, in the question "when does the supersonic jet fly?", the main ontological category of the question is TIME as dictated by the word "when", and the subject noun is "jet". In the sentence "The supersonic jet flies every Monday", a search would begin from "jet" in both directions (to the left and to the right of "jet") and a match would be found for the ontological category TIME in "every Monday". The weight added to the answer object would be 2.

At this point the tree is traversed from each node to its children until every node is reached. For every node visited, a forward and backward searched is conducted in the semantic vector within the limits of the pre-established threshold. The match is first attempted based on exact literal comparison. If an exact literal comparison is not found, the search proceeds to compare synonyms. If this also fails, the search is based on ontological category comparison.

If a match is found, a new reference position is given to the answer object. Each type of match has a specific weight. For better clarity, we will call this weight hereafter the match weight. In each search the distance between the new reference position and the old reference position is subtracted and multiplied by the match weight. The result is then added to the weight of the answer object. As explained above, the semantic vector is a representation of the text where an answer is to be found. The semantic object found in the vector with the lowest position and the semantic object with the highest position the boundaries of the answer. This portion of the text (or answer) retrieved from the main text is stored in the answer object. When the entire conceptual tree has been traversed, the answer object contains an accumulated weight and a textual answer. It should be noted that no longer 1701 and 1702 would be null. This process of traversing the tree and searching in the semantic vector is repeated for every answer object in the answer vector. The answer object with the lowest weight contains the closest answer for fulfilling the user's request.

The above heuristic algorithm employed by the HEA can also be explained with the following pseudo code. In the following pseudo code, we assume that the customized text for a specific user has already been created and it is readily available in memory:

```
Load Conceptual Tree from main process
Load Semantic Dictionary into memory
Initialize a Semantic Vector
For each word in Customized Text do
    For each record in the Semantic Dictionary do
        If word in Customized Text = word in Semantic Dictionary then
            Create a new Semantic Object which includes:
                - ontological category
                - synonyms
                - super class
                - actual word
                Add Semantic Object to Semantic Vector
        End if
    End for
End for
Traverse Conceptual Tree to look for SUBJECT
If SUBJECT found in Current Node then
    Main Reference Point = word (Current Node)
```

```
End if
Else begin
    Traverse Conceptual Tree to look for DIRECT OBJECT
    If DIRECT OBJECT found in Current Node then
        Main Reference Point = word (Current Node)
    End if
    Else begin
        Traverse Conceptual Tree to look for MAIN VERB
        If MAIN VERB found in Current Node then
            Main Reference Point = word (Current Node)
        End if
    End begin
End begin
Initialize Answer Vector
For each Semantic Object in the Semantic Vector do
    If word = Main Reference Point then
        Create a new Answer Object
        Set the Offset Position in the Answer Object
    End if
End for
Set Threshold
Count the number of nodes in the Conceptual Tree
Tree Weight = Number of Nodes × Threshold
Check Root of the Conceptual Tree
Main Ontology = Ontological Category of sentence (Root Node)
For each Answer Object do
    Get the offset position
    Set index = offset position
    Initialize Position Vector
    Add offset position to Position Vector
    // Scan Semantic Vector to right side of the main reference point
    While (index− offset position) < threshold and
        Main Ontology not equals Semantic Object Ontology do
        If Main Ontology = Semantic Object Ontology then
            OntologyFound = true;
            Right Ontology Position = index;
        End if
        Increment index
    End while
    Set index = offset position
    // Scan Semantic Vector to left side of the main reference point
    While (offset position − index) < threshold and
        Main Ontology not equals Semantic Object Ontology do
        If Main Ontology = Semantic Object Ontology then
            OntologyFound = true;
            Left Ontology Position = index;
        End if
        Decrement index
    End while
// If a match was found in both directions, pick the match with
the lowest weight.
    If Ontology Found then
        If (Right Ontology Position − offset position) >
            (offset position − Left Ontology Position) then
            Final Position = Left Ontology Position
            Current Weight = offset position − Final Position;
        End if
        Else
            Final Position = Right Ontology Position
            Current Weight = Final Position − offset position;
        End if
    End if
    Else
        Current Weight = Threshold
    Add Current Weight to the Answer Object Weight
    Add Final Position to Position Vector
    Set index = offset position
    For each Node in the Conceptual Tree traversing Depth
    First Search do
        While (index − offset position) < threshold and
            Node is not similar to Semantic Object do
            If Node is similar Semantic Object then
                Found = true;
                Right Position = index;
                If match was based on exact word then
                    Right match weight = 1
                Else
                    If match was based on super class then
                        Right match weight = 1.2
                    Else
                        If match was based on synonym then
                            Right match weight = 1.4
                        Else
                            If match was based on Ontological category then
                                Right match weight = 1.6
                            End if
            Increment index
        End while
        Set index = offset position
        While (offset position − index) < threshold and
            Node is not similar to Semantic Object do
            If Node is similar Semantic Object then
                Found = true;
                Left Position = index;
                If match was based on exact word then
                    Right match weight = 1
                Else
                    If match was based on super class then
                        Left match weight = 1.2
                    Else
                        If match was based on synonym then
                            Left match weight = 1.4
                        Else
                            If match was based on Ontological category then
                                Left match weight = 1.6
                            End if
            Decrement index
        End while
        // If a match was found in both directions, pick the match with the
        lowest weight.
        If Found then
            If (Threshold − Right Position * Right Match Weight) >
                (Threshold − Left Position * Left Match Weight) then
                Final Position = Left Position
                Match Weight = (offset position − Left Position) *
                    Left Match Weight
            End if
            Else
                If (Threshold − Left Position * Left Match Weight) >=
                    (Threshold − Right Position * Right Match Weight) then
                    Final Position = Right Position
                    Match Weight = (Right Position − offset position ) *
                        Right Match Weight
                End if
            Current Weight = Match Weight;
        End if
        Else begin
            Current Weight = Threshold
            Index = Final Position
        End Else
        Add Final Position to Position Vector
    End for // (for each node)
    Retrieve Answer from customized text
    between words with index = Min(Position Vector)
                and Max(Position Vector)
    Set Answer in the Answer Object
End for // (for each answer object)
```

In the above algorithm, the Answer Object with the lowest weight has the best answer. In this algorithm, the resulting weight can never be less than the tree weight. If it is the same, the answer is a perfect match to the question. The greater the resulting weight is over the tree weight, the less precise the answer is. Therefore, the answer objects have a percentage weight when their weights are calculated relative to the Tree Weight.

It is important to note that in the Conceptual Structure the deeper concepts (or conceptual constituents) provide more detail about the meaning of the request. The deeper they are, the more detail they provide. Each conceptual constituent in the Conceptual Structure corresponds to a sub-tree within the Conceptual Tree. Therefore, in the search process described above, the more matches that occur down the tree, the more detailed that the answer is in relation to the question; otherwise, if the matches only occur at the top of the tree, the answer is related, but less relevant to the user's request.

As we see, in the above embodiment of this invention, which is the preferred embodiment, the hierarchy of the Conceptual Tree dictates the search. As every node is visited in the tree, the corresponding meaning enclosed by the node is searched in the Semantic Vector. In an other embodiment of this invention, the search is done based on priorities dictated by different phrasal categories that are expected to be found in the Conceptual Tree. As in the above embodiment, the main reference point is found first based on, either the SUBJECT, or the DIRECT OBJECT, or the MAIN VERB. The Main Ontological Category is searched next as in the above embodiment. However, in this embodiment, a part of speech is chosen to be searched next, as long as that phrasal category is not in the main reference point. If the main reference point is a SUBJECT, the next phrasal category to be searched by is the MAIN VERB. The next phrasal category to be searched by is the arguments of the MAIN VERB. The DIRECT OBJECT is then searched and retrieved from the tree, if it exists, and then searched in the text (Semantic Vector). Then the PREPOSITIONAL phrases are searched next. Then other phrasal categories follow. ADJECTIVES are searched within each major phrasal category.

It should be apparent from this description that the HAE is capable of performing heuristic searches in third party information systems, without being aware of how the third party information is stored or where it is stored, or even the specific business rules that are necessary for retrieve it. This capability is possible because the HEA employees the two step approach of:

1—Leveraging the existing application to retrieve the information narrowed down to the specific user needs.

2—Applying linguistic theory and heuristics for searching through a plurality of answers.

In addition, it is important to recall that the system provides a simple, yet powerful paradigm to the developer for creating an answer template with reference to the specific calls that fill in all possible answers.

Retrieving Multiple Information Media in Relation to the Answers Retrieved by the Heuristic Answer Engine With this invention, it is possible to retrieve related information to the answers, which are retrieved by the HAE. This information can come in different types of media such as images, videos, sounds or text. It is well known by those familiar with the arts of the World Wide Web and the Internet, that a simple URL address can be used to retrieve any such media. It is also well known by those knowledgeable of such arts, that "Web friendly" programming languages, such as Java, or CGI can be used to read in such media from a URL address. In a preferred embodiment of this invention, along with text answers provided in the answer template, a URL tag is provided to specify what related information should be retrieved, which complements the textual answer. FIG. 18 shows the augmented second part of the answer template that was previously presented in FIG. 14B. Therefore, when the HAE retrieves the answer it also looks for the URL tag (1800), which may be included in each answer text. In a preferred embodiment of this invention, if a URL is found, the HEA retrieves the BLOB object found in the URL and then it stores it in the answer object. Therefore, the answer object would contain yet another attribute which would be a multimedia vector, because multiple URLs can be specified for a specific answer. In another embodiment, data is not retrieved from the URL and the URL address is placed in the answer object for further processing by the client application. In either embodiment, the user interface (as in FIG. 1 (7)) is responsible deciding whether it wants to use the extra information and how to present it.

For example, if a user asks the question "what is the interest in my savings account?", the first answer in FIG. 18 is retrieved. In addition to the answer, which is specific to the user question and to his particular account, a video clip is presented showing how the interest of the bank are much better than those provided by other institutions. With this method of retrieving information, we are matching user's intentions with probable interesting information through the answers that are retrieved (and not through the questions).

Method for Improving Speech Recognition Leveraging the Different Components of the System A typical commercial speech recognition system like (e.g. Nuance[1], SpeechWorks[2]) is capable to return multiple orthographic transcriptions of the recognized utterances. Orthographic transcriptions are possible text representation of the user speech. Although the transcriptions are given with a score of confidence from the speech recognition system, many times multiple transcriptions have the same score, or the scores are too close to make a clear determination of the correct transcription.

[1] Nuance is a trademark of Nuance, Inc.
[2] SpeechWorks is a trademark of SpeechWorks, Inc.

The client interface (100) is capable to send a vector of requests. The main process (101) is also capable to return a vector of answers resulting from the input vector.

As multiple transcriptions are fed into the grammar parser (102), the grammar parser analyzes the syntax and part of the semantics. As explained above, the grammar parser uses syntactical grammars to evaluate the correctness of the syntax. If the request is not syntactically correct, it is rejected. Also as explained above, based on the semantic dictionary used by the grammar parser, the grammar parser is capable to detect whether or not the request being processed makes sense. If it does not make sense, the grammar parser would reject it and the main process (101) would feed the next text. If instead, the grammar parser successfully returns a conceptual structure from the text, the conceptual structure is either sent to the HEA (106) or the STIE (107). Either one of these subsystems returns an answer object with a score. If the STIE returns an answer object, the score is always set to 100% because the STIE has no room for error. HEA, however, can return scores anywhere from 0% to 100%.

If multiple orthographic transcriptions are fed to the Grammar Parser (102), some may be filtered out by the Grammar Parser. Others would yield multiple conceptual structures, which are then passed to either the HEA (106) or the STIE (107). In such case, the subsystems HEA and STIE would return multiple answer objects, each with a score (an answer object for each conceptual structure). At this point, the main process (101) sorts all the answer objects by their scores and selects the answer with the highest score. The orthographic transcription, which yields an answer object with the highest score, is therefore the best orthographic transcription. The selected orthographic transcription and answer object is then sent to the client interface (100).

For example, let us consider a database of events in the Bible, where a customized text has been generated by the HEA with paragraphs of the events. One paragraph talks about how Thomas, the disciple, at first did not believe that Jesus had resurrected, but later he was convinced by the physical presence of Jesus and his wounds. A user then asks the question, "How did Thomas believe Jesus?" using a speech recognition system. The speech recognition system may produce the following orthographic transcriptions because they all sound alike the original utterance:

1—How did Thomas believe Jesus?
2—How did Thomas leave Jesus?
3—How did Thomas decease Jesus?
4—How did Thomas Steve Jesus?

All four transcriptions are fed into the main process (101) as texts through the client interface (100) and then to the Grammar Parser (102). Transcription number 4 is syntactically incorrect, so it would be thrown away by the Grammar Parser. Number 3 is semantically incorrect, because according to the semantic vector, the verb "decease" is a function of the form f(X), that is, "decease" has only one argument (the person who decease) and it does not have a direct object, so it would also be rejected by the grammar parser. Both number 1 and 2 are syntactically and semantically correct, and therefore they yield corresponding conceptual trees from the grammar parser (102), which are then fed into the HEA. The answer object for request number 2 comes back from the HEA with a poor score because, although the customized text contains passages with Thomas and Jesus, it doesn't contain any passage where Thomas leaves Jesus. However, the answer object for request number 1 comes back with a very high score, because there is indeed a passage that talks about when Thomas finally believes Jesus. We can say, therefore, that request number 1 is more within context of the text than request number 2 ("context" is a term well known in the art of Linguistics).

In the banking example, the request "I'd like to transfer money from my savings" may yield two orthographic transcriptions from the speech recognition system:

1—How do I transfer from my savings
2—I'd like to transfer money from my savings The customized text may contain a paragraph such as
"The way to transfer money from savings to checking is: just tell me what to do"

In this example, both transcriptions are syntactically correct and semantically correct. Both transcriptions would yield conceptual trees; one would be processed by HEA and the other by STIE. The HEA would return an answer object with a relatively high score. At the same time, the STIE would return a % 100 score, in which case, the answer object from the STIE would be selected by the main process, and thereby its corresponding transcription.

We can see, therefore, that when the system described in this invention creates a context in which speech recognition is employed, the invention is capable to narrow down the orthographic transcription, thereby improving the recognition results.

I claim:

1. Apparatus for maintaining unrestricted natural language discourse with humans and interacting with third party application programs comprising:
   a plurality of user interfaces for allowing humans to input natural language phrases selected from the group consisting of speech and written text,
   a processor,
   storage means for storing data on a storage medium and having groups of executable instructions stored therein and,
   wherein said processor is configured to execute said groups of executable instructions stored in memory, and said groups of executable instructions further comprise:
   a. program logic responsive to said natural language phrases input and configurable to determine whether said natural language is:
      i. a precise request if and only if said natural language phrase successfully meets the syntactical rules of a context-free user grammar as defined by a user for a specific application or
      ii. a fuzzy request if said natural language phrase successfully meets the syntactical rules of a context-free universal grammar for all possible natural language phrases, but does not meet the syntactical rules of a said user grammar
   b. program logic responsive to said fuzzy request and configured to process said fuzzy request speculatively and returning an approximated answer
   c. program logic responsive to said precise request and configured to process said precise request precisely and returning one of the following:
      an answer that precisely answers said human's request
      a confirmation
      a follow up prompt for specifying further information
   d. program logic responsive to said natural language phrases and configured to:
      identify said natural language phrases as a unexpected spontaneous request in the context of a dialog,
      process said natural language phrases as a unexpected spontaneous request and,
      reply to said unexpected spontaneous request
   e. program logic responsive to said natural language phrases and configured to identify an expected human phrase that is a reply to a prompt previously made by said system and, to request further information from said human user.

2. The apparatus of claim 1, wherein said program logic responsive to said natural language phrases and configured to process said spontaneous human phrase is further configured to:
   detect when said spontaneous phrase initiates a brand new discourse segment, detect when said spontaneous human phrase diverges in meaning or context from a discourse segment already in progress, so forth initiating a second discourse segment,
   engage in said second discourse segment, and
   resume to the initial discourse segment.

3. The apparatus of claim 1, wherein said program logic responsive to said fuzzy request is further configured to convert said fuzzy request into a plurality of fuzzy query objects and cause a plurality of heuristic, stochastic, fuzzy logic, or speculative retrieval steps from a repository of answers.

4. The apparatus of claim 1, wherein said program logic responsive to said precise request, is further configured to process precisely by:
   a. converting said precise requests into a plurality transaction steps
   b. converting said precise requests into a plurality of query steps
   c. invoking and execute said transaction steps and said query steps.

5. The apparatus of claim 1, wherein said program logic responsive to said natural language phrase, is further configured to detect if:
   a. said precise request is a complete request, thereby containing all the information necessary to invoke and execute said transaction steps and said query steps, or
   b. said precise request is an incomplete request, thereby containing part of the information necessary to invoke and execute said transaction steps and said query steps.

6. The apparatus of claim 1, wherein said program logic responsive to said natural language phrase, is further configured to derive a semantic representation of said natural language phrase from the syntactical analysis performed with said context free grammars, and said semantic representation is arranged as a tree structure of semantic objects.

7. The apparatus of claim 1, wherein said program logic responsive to said fuzzy request is further configured to retrieve data and convert it to a natural language narrative being customized for each user, and further comprising:
   a. a digital document containing narrative paragraphs and phrases for fulfilling any fuzzy request,
   b. a plurality of value placeholders, which hold returned data values from a data source being embedded in said repository of narrative paragraphs,
   c. first program object code for retrieving data from said data source and for replacing said value placeholders by the returned values,
   d. second program object code for combining said returned values with said narrative paragraphs, whereby the complete answers within the paragraphs are customized for the human's specific needs, and for returning a set of complete narrative answers,
   e. third program object code for searching heuristically the answers within said narrative paragraphs and retrieving the narrative answer that best matches said fuzzy request.

8. The apparatus of claim 1, wherein program logic responsive to said fuzzy request and returning a narrative answer, is also configured to,
   return a score relative to the approximation in which the answer satisfies said fuzzy request
   return a score relative to the precise request and is further configured to ascertain the best recognition result produced by speech recognition system and further comprising,
   a. first program object code for receiving from said recognition system a plurality of text strings, which are the candidate recognition results of a single utterance
   b. second program object code for determining the best recognition result depending on said score.

9. The apparatus of claim 1 for searching heuristically through a plurality of natural language answers and retrieving the best answers pertaining to a question and further comprising:
   groups of executable instructions comprising:
      a. first program object code for converting said plurality of natural language answers into a vector of semantic objects, wherein each member of the set corresponds to a semantic object, each said semantic object containing semantic information about the word, its role in the phrase, and its offset position in the phrase
      b. second program object code for traversing the structure of said semantic representation and searching said semantic vector by logically comparing the semantic objects of said semantic representation with the semantic objects of said vector in the order directed by said traversing of the semantic representation
      c. third program object code for converting said semantic vectors, which have been successfully matched by second program object code, into natural language phrases.

10. The apparatus of claim 6 for processing the semantic representation of a user request and further comprising:
    groups of executable instructions comprising:
       a. a reference to a section in said storage means storing said semantic representation of user requests being arranged as a structure of semantic objects
       b. a reference to a section in said storage means storing a plurality of rule base systems or state machines, such that each rule base system makes reference to an third party application program and each rule in said rule base system is a state, which corresponds to a piece of information necessary to complete said third application program and further contains instruction steps
       c. program object code for traversing said semantic representation and pattern-matching said semantic objects found of said semantic representation with the rules of said rule base system, such that the matching rules are inactive states and the unmatched rules are converted to active states
       d. program object code for requesting said human for information associated to said active states until all information required for executing said third party application is provided by said human
       e. program object code for executing the instruction steps of said active states and replying to said human
       f. program object code for executing said third party application when all said states are inactive whereby the system understands and processes said human's request and interacts with said human in the context of a dialog at the same time that interacts with a said third party application.

11. Method for distinguishing and categorizing a plurality of natural language requests from a human being, depending on whether or not said human being is demanding precise specific actions, into: exact queries selected from the group of specific instructions and fuzzy queries selected from the group of fuzzy requests comprising the steps of:
    a. receiving a natural language phrase from a plurality of user interfaces
    b. sending requests to a parser generator, which takes as input a context free grammar and a natural language phrase
    c. parsing said natural language phrase with said parser generator and a user grammar that contains production rules for requests specific to the functions available in a third party application
    d. parsing said natural language phrase with said parser generator and a predefined universal grammar that contains a comprehensive set of syntactical rules for a specific natural language and said syntactical rule are independent of third party applications
    e. determining whether said parser generator successfully parses the natural language phrase with said user grammar, or said parser generator successfully parses the natural language phrase with said universal grammar f. producing a semantic representation of said phrase
g. sending said semantic representation to be interpreted as a precise transaction if said parser generator successfully parses said natural language phrase with said user grammar
h. sending said semantic representation to be interpreted as a precise query if said parser generator successfully parses said natural language phrase with said user grammar
i. sending said semantic representation to be interpreted as a fuzzy query to a heuristic search engine if the parsing with said user grammar is not successful, but the parsing with said universal grammar is successful.

12. The method of claim 11, wherein said natural language sentences can be further categorized in additional categories other than said fuzzy queries and said precise requests, comprising the steps of: adding additional grammars that take third priority behind said user grammar and said universal grammar, such that if said parser fails with said user grammar and said universal grammar, said parser tries to parse said natural language request with said additional grammars, thereby categorizing said natural language request into said additional categories.

13. A method for reducing the development time of conversational dialogs by dividing user requirements into,
   exact requests that can meet the syntactical rules of a user grammar as defined for a specific user application and that can be satisfied with precisions, and
   fuzzy requests that can be parsed with the syntactical rules of a universal grammar, but not with said user grammar and that can be satisfied with approximated answers,
   the method further comprising the steps of:
   a. creating a template of answers, that map to said requests that can be satisfied with approximated answers, with reference calls to a plurality of third party software applications and value placeholders for holding returned data values from said software applications embedded in the narrative of said answers,
   b. creating a grammar for said requests that must be satisfied with precision, and including ontological categories in the grammar rules of said grammar
   c. creating a plurality of rule base systems, such that each rule base system corresponds to a transaction which in term corresponds to a plurality of said requests that must be satisfied with precision and such that each rule is tagged with the same ontological categories as in said grammar, and each said rule base system makes reference to an third party application program and each rule in said rule base system is a state, which corresponds to a piece of information necessary to complete said third application program.

14. Apparatus for managing a multiplicity of types of communicative acts in a natural language discourse comprising:
   a plurality of user interfaces for allowing humans to input natural language phrases selected from the group consisting of speech and written text,
   a processor,
   storage means for storing data on a storage medium and having groups of executable instructions stored therein and,
   wherein said processor is configured to execute said groups of executable instructions stored in memory, and said groups of executable instructions further comprise:
   a. a multiplicity of context free grammars stored in said storage means wherein each grammar comprises syntactical rules for breaking down syntactically a natural language phrases that express one type of communicative act
   b. program logic responsive to said natural language phrases input configured with said multiplicity of context free grammars in order to break down the syntactical structure of said natural language input, such that only one context free grammar is used successfully for breaking down the syntactical structure of one natural language phrase whenever said natural language phrase meets the syntactical rules of said context free grammar whereby, depending on which context free grammar is used successfully said program logic determines the type of communication act
   c. program logic responsive to said natural language phrases input and to said multiplicity of context free grammars, is further configured to utilize said context free grammars according to priorities, such that once a type communication act has been identified, no other context free grammars are utilized
   d. program logic responsive to the context free grammars that can process successfully said natural language phrase configured to traverse the grammar hierarchically and recursively and produce a hierarchical semantic structure containing semantic information including ontological categories, functions, lexicons and synonyms
   e. program logic responsive to said semantic structure and said Boolean indicator and configured to determine the type of communicative act and to process said semantic structure depending on said type of communicative act unstructured data source.

* * * * *